(12) United States Patent
Sadek et al.

(10) Patent No.: US 9,503,134 B2
(45) Date of Patent: Nov. 22, 2016

(54) METHODS AND APPARATUS FOR ADAPTING TRANSMITTER CONFIGURATION FOR EFFICIENT CONCURRENT TRANSMISSION AND RADAR DETECTION THROUGH ADAPTIVE SELF-INTERFERENCE CANCELLATION

(71) Applicant: QUALCOMM Incorporated, San Diego, CA (US)

(72) Inventors: Ahmed Kamel Sadek, San Diego, CA (US); Matthew Stuart Grob, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/457,416

(22) Filed: Aug. 12, 2014

(65) Prior Publication Data

US 2015/0296413 A1 Oct. 15, 2015

Related U.S. Application Data

(60) Provisional application No. 61/978,596, filed on Apr. 11, 2014.

(51) Int. Cl.
*H03D 1/06* (2006.01)
*H04B 1/10* (2006.01)
(Continued)

(52) U.S. Cl.
CPC ............ *H04B 1/1027* (2013.01); *H04L 1/00* (2013.01); *H04W 16/14* (2013.01); *H04B 1/525* (2013.01)

(58) Field of Classification Search
CPC ................................................. H04B 7/0413

USPC ........................................................ 375/348
See application file for complete search history.

(56) References Cited

U.S. PATENT DOCUMENTS 8,116,688 B2  2/2012 Matsumoto et al.
8,244,184 B2  8/2012 Namekata et al.
(Continued)

OTHER PUBLICATIONS

Ahmed E., et al., "Simultaneous transmit and sense for cognitive radios using full-duplex: A first study", IEEE Antennas and Propagation Society International Symposium (APSURSI), Jul. 8, 2012, pp. 1-2, XP032471513, DOI: 10.1109/APS.2012.6348493, ISBN: 978-1-4673-0461-0.
(Continued)

*Primary Examiner* — Lihong Yu
(74) *Attorney, Agent, or Firm* — Arent Fox LLP

(57) ABSTRACT

Certain aspects of the present disclosure relate to adapting transmitter configuration for efficient concurrent primary user detection through adaptive self-interference cancellation. A wireless transmitting device may schedule a transmission in a shared spectrum. The device may scan at least a portion of the shared spectrum during the transmission to receive a signal. Interference caused by the transmission may be cancelled from the received signal using self-interference cancellation circuitry. The device may determine whether the received signal indicates usage by a primary user of the shared spectrum. In an aspect, the transmission may be a SISO transmission. In another aspect, carrier aggregation may be used for the transmission and a potential carrier may be subject to primary user detection. The device may determine a self-interference cancellation complexity for a combination of carriers including the potential carrier, and may select one or more carriers for aggregation based on the self-interference cancellation complexity.

26 Claims, 14 Drawing Sheets

(51) Int. Cl.
  *H04W 16/14*  (2009.01)
  *H04L 1/00*  (2006.01)
  *H04B 1/525*  (2015.01)

(56) References Cited

U.S. PATENT DOCUMENTS

| | | | |
|---|---|---|---|
| 2009/0268833 A1* | 10/2009 | Ariyavisitakul | H04B 7/0854 375/262 |
| 2011/0122808 A1* | 5/2011 | Pandharipande | H04B 7/15585 370/315 |
| 2011/0195657 A1* | 8/2011 | Takeda | H04B 7/15585 455/7 |
| 2012/0002578 A1* | 1/2012 | Ji | H04L 1/16 370/281 |
| 2012/0063373 A1* | 3/2012 | Chincholi | H04L 5/001 370/281 |
| 2012/0149411 A1* | 6/2012 | Miyoshi | H04B 7/0413 455/501 |
| 2012/0164951 A1* | 6/2012 | Wang | H04B 7/0617 455/63.4 |
| 2013/0039298 A1 | 2/2013 | Park et al. | |
| 2013/0230088 A1* | 9/2013 | Arad | G01R 29/08 375/228 |
| 2013/0252640 A1 | 9/2013 | Kenney et al. | |
| 2013/0314267 A1 | 11/2013 | Kenney et al. | |
| 2014/0169234 A1* | 6/2014 | Zhu | H04W 72/082 370/277 |

OTHER PUBLICATIONS

Cheng W., et al., "Full duplex spectrum sensing in non-time-slotted cognitive radio networks", IEEE, Military Communications Conference, MILCOM, Nov. 7, 2011, pp. 1029-1034, XP032092698, DOI: 10.1109/MILCOM.2011.6127431, ISBN: 978-1-4673-0079-7.

International Search Report and Written Opinion—PCT/US2015/024567—ISA/EPO—Aug. 3, 2015. (10 total pages).

Wessam A., et al., "Adaptive transmission-reception-sensing strategy for cognitive radios with full-duplex capabilities", IEEE, International Symposium on Dynamic Spectrum Access Networks (DYSPAN), Apr. 1, 2014, pp. 149-160, XP032596064, DOI: 10.1109/DYSPAN.2014.6817792 [retrieved on May 16, 2014].

* cited by examiner

METHODS AND APPARATUS FOR ADAPTING TRANSMITTER CONFIGURATION FOR EFFICIENT CONCURRENT TRANSMISSION AND RADAR DETECTION THROUGH ADAPTIVE SELF-INTERFERENCE CANCELLATION

RELATED APPLICATIONS

This application claims priority from U.S. Provisional Application No. 61/978,596 entitled "Methods and Apparatus for Adapting Transmitter Configuration for Efficient Concurrent Transmission and Radar Detection Through Adaptive Self-Interference Cancellation," filed on Apr. 11, 2014, which is incorporated herein by reference in its entirety.

BACKGROUND

Aspects of the present disclosure relate generally to wireless communications, and more particularly, to techniques for concurrent transmission and radar detection.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (CDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

To supplement conventional base stations, additional restricted power or restricted coverage base stations, referred to as small coverage base stations or cells, can be deployed to provide more robust wireless coverage to mobile devices. For example, wireless relay stations and low power base stations (e.g., which can be commonly referred to as Home NodeBs or Home eNBs, collectively referred to as H(e)NBs, femto cells, pico cells, etc.) can be deployed for incremental capacity growth, richer user experience, in-building or other specific geographic coverage, and/or the like. Such low power or small coverage (e.g., relative to macro network base stations or cells) base stations can be connected to the Internet via broadband connection (e.g., digital subscriber line (DSL) router, cable or other modem, etc.), which can provide the backhaul link to the mobile operator's network. Thus, for example, the small coverage base stations can he deployed in user homes to provide mobile network access to one or more devices via the broadband connection. Because deployment of such base stations is unplanned, low power base stations can interfere with one another where multiple stations are deployed within a close vicinity of one another.

Operation of wireless devices in certain portions of a shared spectrum may require detection of a primary user of the shared spectrum. For example, operation in certain portions of the unlicensed spectrum, such as portions of the 5 GHz band, requires radar detection through dynamic frequency selection (DFS) to avoid interference with radar systems. Different regulatory domains may have different requirements. To detect radar, a wireless device needs to create transmission gaps in which the device is quiet to listen to the medium and detect if radar is present. If a radar signal is present, the device needs to vacate the channel according to regulation timing requirements. The transmission gaps result in a reduction in system throughput and capacity for wireless devices using a portion of the spectrum requiring DFS.

In view of the foregoing, it may be understood that there may be significant problems and shortcoming associated with current DFS technology.

SUMMARY OF THE DISCLOSURE

Various aspects are now described with reference to the drawings. In the following description, for purposes of explanation, numerous specific details are set forth in order to provide a thorough understanding of one or more aspects. It may be evident, however, that such aspect(s) may be practiced without these specific details. The following presents a simplified summary of one or more aspects in order to provide a basis understanding of such aspects.

In an aspect, the disclosure provides a method for wireless communication. The method may include scheduling a transmission in a shared spectrum; scanning at least a portion of the shared spectrum during the transmission to obtain a received signal; cancelling, at least partially from the received signal, an interference caused by the transmission on the received signal, wherein the cancelling comprises processing the received signal using a self-interference cancellation circuitry; and determining whether the received signal indicates usage by a primary user of the shared spectrum.

The disclosure further provides, in another aspect, an apparatus for wireless communication. The apparatus may include means for scheduling a transmission in a shared spectrum; means for scanning at least a portion of the shared spectrum during the transmission to obtain a received signal; means for cancelling, at least partially from the received signal, an interference caused by the transmission on the received signal, wherein the cancelling comprises processing the received signal using a self-interference cancellation circuitry; and means for determining whether the received signal indicates usage by a primary user of the shared spectrum.

In an aspect, the disclosure provides a non-transitory computer readable medium storing computer executable code. The computer readable medium may include instructions for scheduling a transmission in a shared spectrum; scanning at least a portion of the shared spectrum during the transmission to obtain a received signal; cancelling, at least partially from the received signal, an interference caused by the transmission on the received signal, wherein the cancelling comprises processing the received signal using a self-interference cancelation circuitry; and determining whether the received signal indicates usage by the primary user of the shared spectrum.

Another aspect of the disclosure provides another apparatus for wireless communication. The apparatus may include a scheduling component configured to schedule a transmission in a shared spectrum; a receiver configured to scan at least a portion of the shared spectrum during the transmission to obtain a received signal; a self-interference cancellation circuit configured to cancel, at least partially from the received signal, an interference caused by the transmission on the received signal; and a processor configured to determine whether the received signal indicates usage by a primary user of the shared spectrum.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DETAILED DESCRIPTION

Figure 1:
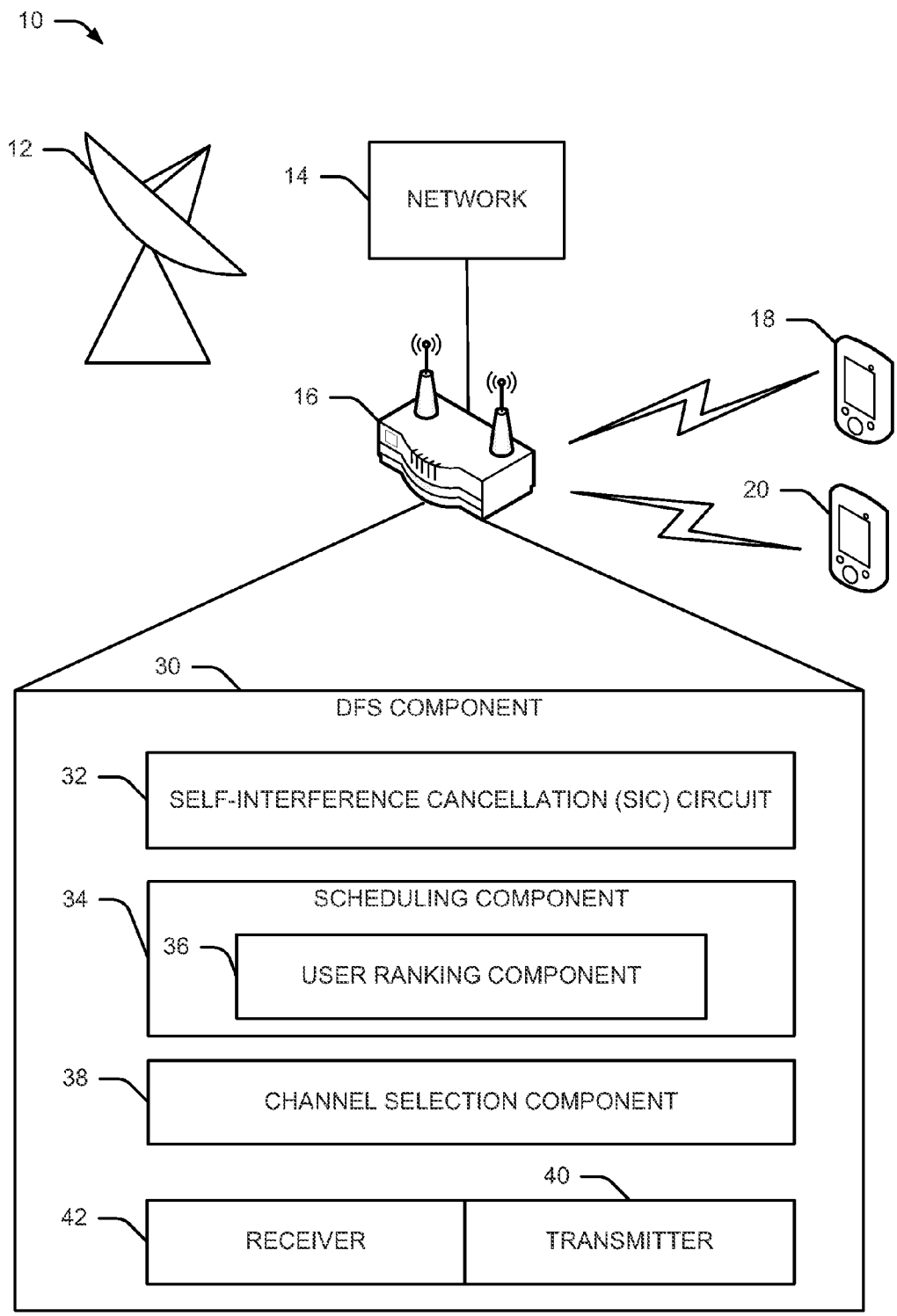
FIG. 1 is a block diagram illustrating an example of a telecommunications system 10 in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband GDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 W), IEEE 802.20, Flash OFDMA, etc. UTRA and E-UTRA are part of Universal Mobile Telecommunication System (UMTS), 3GPP Long Term Evolution (LTE) and LTE-Advanced (LTE-A) are new releases of UMTS that use E-UTRA, UTRA, E-UTRA UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LIE, and LTE terminology is used in much of the description below.

Self-interference cancellation may be used to create a virtual transmission gap for detecting radar at a frequency requiring DFS. That is, self-interference cancellation may be used to transmit signals during a period in which otherwise signal transmission would not take place (e.g., during a void or gap in transmission) because most or all of the interference caused by a signal being transmitted on a signal being concurrently received can be cancelled or removed from the signal received. Basically, self-interference cancellation may be used to cancel a transmitted signal from a received signal. Self-interference cancellation, however, comes with various costs. For example, self-interference cancellation may increase circuit complexity and power consumption compared to using a transmission gap. Accordingly, a wireless device operating in frequency band requiring dynamic frequency selection (DFS) may selectively apply self-interference cancellation and select transmission characteristics based on self-interference cancellation requirements.

In particular, a wireless device may apply self-interference cancellation when a system load makes it beneficial to do so, for example, when transmission scheduling does not include natural transmission gaps (e.g., an actual gap or void in signal transmission) for which there is no data requiring transmission. Transmission properties may be selected that reduce the costs of self-interference cancellation. For example, self-interference cancellation may be limited to particular types of transmissions such as single-input single-output (SISO) transmissions. As another example, channel combinations for carrier aggregation may be selected that reduce the costs of self-interference cancellation. For example, inter-band carriers and contiguous intra-band carriers may be preferable for carrier aggregation compared to non-contiguous intra-band carriers because the implementation of self-interference cancellation may be more complex and/or challenging for the latter.

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 1 is a block diagram illustrating an example of a telecommunications system 10 in accordance with an aspect of the present disclosure. For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on. In some aspects, an access point may also be referred to as a network entity or may be included as part of a network entity.

The term "small cell," as used herein, refers to a relatively low transmit power and/or a relatively small coverage area cell as compared to a transmit power and/or a coverage area of a macro cell. Further, the term "small cell" may include, but is not limited to, cells such as a femto cell, a pico cell, access point base stations, Home NodeBs, femto access points, or femto cells. For instance, a macro cell may cover a relatively large geographic area, such as, but not limited to, several kilometers in radius. In contrast, a pico cell may cover a relatively small geographic area, such as, but not limited to, a building. Further, a femto cell also may cover a relatively small geographic area, such as, but not limited to, a home, or a floor of a building.

The present disclosure relates in some aspects to techniques that facilitate concurrent primary user detection and transmission using self-interference cancellation. In one aspect, a primary user of a shared spectrum may refer to a user of the shared spectrum involved in radar operations, while a secondary user of the shared spectrum may refer to any other user of the shared spectrum that is not involved in radar operations. Primary user detection may be required in certain portions of shared spectrum such as unlicensed spectrum. For convenience, the use, operation, extension, and/or adaptation of LTE and/or LTE Advanced for applications in an unlicensed radio frequency (RF) band may be referred to herein as "LTE/LTE Advanced in unlicensed spectrum," "adapting LTE/LTE Advanced in unlicensed spectrum," "extending LTE/LTE Advanced to unlicensed spectrum," and "LTE/LTE Advanced communications over unlicensed spectrum" etc. Moreover, a network or device that provides, adapts, or extends LTE/LTE Advanced in unlicensed spectrum may refer to a network or device that is configured to operate in a contention-based radio frequency band or spectrum.

In an aspect, the telecommunications system 10 may include various devices that may communicate using a shared portion of the spectrum. In one example, the shared portion of the spectrum may include an unlicensed portion of the spectrum. A shared portion of the spectrum may include any frequency band that, for example, allows usage by more than one technology or network. For example, devices may use a portion of a 5 GHz band, which may also be referred to as an unlicensed national information infrastructure (U-NII) radio band. In an aspect, devices may use a portion of spectrum, for example the U-NII-2 band, which requires dynamic frequency selection (DFS) or radar avoidance. In one aspect, radar may be considered a primary user of the U-NII-2 band. In another aspect, various types of wireless communications operations may also be users of the U-NII-2 band, which in some instances may be referred to as secondary users of the U-NII-2 band. Different regulatory domains, however, may have different requirements for DFS or radar avoidance (e.g., they may use a different band for radar operations). Other examples of shared spectrum include lightly licensed spectrum such as, for example, TV white space and the 3.5 GHz band. Other examples of primary users may include analog TV, digital TV, wireless microphones, emergency services, and government agencies. A primary user may generally have some level of priority or preference over its respective shared spectrum when compared to other (e.g., secondary) users. The telecommunications system 10 may include a radar device 12, a wireless network 14, a small cell node 16, and user equipment 18, 20.

In an aspect, radar device 12 may be any device that uses radar, and may transmit and/or receive radar signals in a frequency band or spectrum used by the small cell node 16 and/or the user equipment 18, 20. For example, radar device 12 may include a terminal Doppler weather radar (TDWR) system. Radar device 12 may be a primary user having preference for using an unlicensed portion of spectrum over other devices. Radar device 12 may periodically transmit signals that may be detected by other devices within a geographic region. Relevant regulations may define geographical distances and frequency ranges where a radar device 12 must be given preference of operation over other devices. In one example, the relevant regulations may require other devices to use DFS, or similar techniques, to avoid interfering with radar device 12.

Network 14 be any communications network. In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage (e.g., macro nodes) while the access terminal may be served at other locations by access nodes that provide smaller scale coverage (e.g., small nodes). A cell associated with a macro node or a small node may be referred to as a macro cell or a small cell, respectively. As such, as used herein, the term "small cell" or "small cell node" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. In some implementations, each cell may be further associated with (e.g., divided into) one or more sectors.

In various applications, other terminology may be used to refer to a macro node or a small node. For example, a macro node may be configured or referred to as an access node, base station, access point, eNodeB, macro cell, and so on. Also, a small node may be configured or referred to as a Home NodeB, Home eNodeB, access point base station, femto cell, femto access point, pico cell, micro cell, etc.

In an aspect, small cell node 16 may be an access point for providing connectivity to network 14 to one or more UEs 18, 20. Small cell node 16 may communicate wirelessly with one or more UEs 18, 20. Small cell node 16 may communicate through a backhaul with network 14. Small cell node 16 may operate in a portion of shared spectrum requiring detection and avoidance of a primary user (e.g., operations of the radar device 12). Small cell node 16 may include a DFS component 30 configured to selectively use self-interference cancellation to perform primary user detection while concurrently transmitting (e.g., transmitting signals to one or both of UEs 18, 20) in a shared spectrum (e.g., an unlicensed spectrum). In an aspect, the term "component" as used within this disclosure may be one of the parts that make up a system, may be hardware or software, and may be divided into other components (e.g., sub-components). Accordingly, small cell node 16 having the DFS component 30 may reduce loss of throughput caused by primary user detection. For example, when self-interference cancellation is used, small cell node 16 may still transmit during periods of primary user detection (e.g., radar usage detection) allowing for higher throughput than when transmission is suspended (e.g., transmission gap) during periods of primary user detection.

DFS component 30 may include hardware such as circuitry, a processor, memory, and/or other means for selectively using self-interference cancellation to concurrently perform primary user detection (e.g., radar usage detection) while transmitting in a shared spectrum. The DFS component 30 may also include software or instructions that, with the hardware, enable the DFS component 30 to perform primary user detection while transmitting. The DFS component 30 may include various sub-components including, for example, a self-interference cancellation (SIC) circuit 32, a scheduling component 34, a channel selection component 38, a transmitter 40, and a receiver 42.

In an aspect, self-interference cancellation circuit 32 may be a circuit configured to cancel, at least partially, interference caused by a transmitter 40 from a signal received by receiver 42. Self-interference cancellation circuit 32 may also be referred to as SIC circuit 32. Various self-interference cancellation circuits are known in the art. One such self-interference cancellation circuit is described in, for example, Bharadia et al. "Full Duplex Radios" SIGCOMM '13 Proceedings of the ACM SIGCOMM 2013 conference on SIGCOMM, pp. 375-386.Self-interference cancellation may impose costs such as price, complexity, and power consumption to the small cell node 16. In an aspect, the term "at least partially," when referring to cancelling interference, may indicate that some, but not necessarily all, of the interference from a source is removed from the received signal. At least partially cancelling interference from a transmitter may reduce the interference to a level such that a primary user of the shared spectrum may be detected. In an aspect, SIC circuit 32 may be limited, to cancelling certain types of transmissions, or limited to cancelling transmissions while operating in particular modes. For example, in a system using multiple transmit antennas, self-interference on each receive antenna needs to take into account not only the signal transmitted from the corresponding transmit antenna, but also cross talk from other antennas. In such example, SIC circuit 32 may he unable to sufficiently cancel interference, or the costs, complexity, or power consumption may be excessive. That is, a self-interference cancellation circuit capable of performing self-interference cancellation in each of multiple antennas may be too costly to implement and operate for it to be an efficient solution to the loss of throughput when using transmission gaps.

In an aspect, scheduling component 34 may be configured to determine transmission periods for scheduling transmissions and radar detection. In an aspect, scheduling component 34 may schedule transmissions and radar detection periods within an LTE frame structure including radio frames, subframes, slots, and symbol periods. Scheduling component 34 may schedule transmissions to one or more UEs and schedule primary user detection at a subframe level. For example, scheduling component 34 may schedule two or more consecutive subframes for primary user detection based on characteristics of the primary user being detected. When the primary user is, for example, the radar operations of radar device 12, the characteristics may include a radar pulse width, number of pulses in a radar burst, and pulse repetition interval. In an aspect, scheduling component 34 may schedule primary user detection during natural gaps (e.g., periods during which there is no transmission) in a transmission schedule. Natural gaps may occur when a small cell node 16 has a relatively light load having fewer transmissions and, consequently, scheduling gaps in the transmission to perform primary user detection may not affect throughput of the small cell node 16. Scheduling component 34 may bypass (e.g., temporarily disabling or avoid using) self-interference cancellation circuit 34 during such natural transmission gaps. In another aspect, scheduling component 34 may schedule a virtual transmission gap for allowing primary user detection. During such virtual transmission gaps, therefore, the scheduling component 34 may also schedule transmission to a UE using a transmission pattern such that SIC circuit 32 may sufficiently cancel the transmission to detect usage by a primary user in a received signal. For example, the scheduling component 34 may use a SISO transmission pattern during a virtual transmission gap and activate self-interference cancellation circuit 32 to cancel the interference from the transmission on a received signal. That is, in virtual transmission gaps there are no natural gaps in the transmission; instead, a period of time is assigned or scheduled for transmission according to the SISO transmission pattern while at the same time usage by a primary user is detected from the received signal by having interference effects caused by the transmission on the received signal cancelled by the self-interference cancellation circuit 32. The scheduling component 34 may schedule a mix of natural and virtual transmission gaps depending on a transmission load. For example, the scheduling component 34 may extend a natural transmission gap to allow primary user detection by scheduling a SISO transmission in a subframe following the natural transmission gap.

In an aspect, scheduling component 34 may also include a user ranking component 36 configured to select a user for which transmission can occur concurrently with primary user detection. The user ranking component 36 may rank users, or UEs, according to capabilities. For example, rank 1 users may be capable of receiving only rank 1 or SISO transmissions, while rank 2 users may be capable of receiving MIMO transmissions. The user ranking component 36 may determine a user rank according to feedback reported by each UE. For example, the feedback may include a channel quality indicator (CQI), rank indicator (RI), and precoding matrix indicator (PMI) reported by each UE.

A SISO transmission scheduled for a virtual transmission gap may have lower throughput than a MIMO transmission scheduled when primary user detection is not performed. Scheduling component 34 may be configured to use a fairness criteria to determine which users are scheduled for a SISO transmission. For example, the use of fairness criteria may involve having SISO transmissions scheduled in a rotating manner among users to prevent one user from receiving only the lower throughput transmissions. Fairness criteria may include, for example, a time or number of transmissions since a last SISO transmission, an average data rate, or a percentage of requested data rate. Further, the scheduling component 34 may select an antenna for a SISO transmission based on spatial channel characteristics of the user equipment in order to select the best antenna that increases the link capacity of the users that will be served by a SISO transmission. Switching from one antenna to the other from one radar-detection period to the next could also be adapted based on the spatial channel characteristics of the user equipment that will be served during the radar-detection pattern or according to the channel state information feedback from the UEs. The small cell node 16 may store copies of the adaptive interference cancellation circuit parameters for each antenna when it switches from one antenna to the next. The amount of time allocated to adapt one of the antennas may be made proportional to the time the antenna is used during the primary user detection (e.g., radar-detection) pattern.

In an aspect, the channel selection component 38 may be configured to select one or more channels for carrier aggregation. The channel selection component 38 may use a smart channel selection algorithm based at least in part on a self-interference cancellation complexity weight. The self-interference cancellation complexity weight may indicate a difficulty or cost of cancelling an aggregated signal using multiple carriers. For example, inter-band carriers and contiguous intra-band carriers may be preferable for carrier aggregation compared to non-contiguous intra-band carriers. Inter-band carriers may use filters to reduce the need for self-interference cancellation. Contiguous intra-band carriers may create linear interference, which is relatively easy to cancel. Non-contiguous intra-band carriers, however, may produce non-linear interference, which may require greater circuit complexity and/or power consumption to cancel. The SIC circuit 32 may be unable to cancel non-linear interference in some situations, in which case the scheduling component 34 may schedule a transmission gap for primary user detection instead of a transmission. No transmissions may be allowed during the transmission gap, thus reducing throughput. Accordingly, the self-interference cancellation complexity weight may be highest when the SIC circuit 32 is unable to cancel the interference of a particular carrier combination. The self-interference cancellation complexity weight may also be based on whether self-interference cancellation is necessary. For example, if the transmission load is relatively light such that the scheduling component 34 is able to schedule natural transmission gaps, the self-interference cancellation complexity weight may be minimal because the natural transmission gaps may be used for primary user detection without self-interference cancellation. If transmission gaps are necessary because self-interference cancellation is complex or not feasible for this carrier combination, the weight can take into account the loss in system capacity associated with the gaps needed to listen for a primary user. During channel selection, a small cell (e.g., small cell node 16) may select a best combination of channels based on a weighted formula. The weighted formula may include a weight based on complexity of self-interference cancellation for carriers in each channel as well as weights based on standard channel selection properties such as interference levels and link quality to different users.

Figure 2:
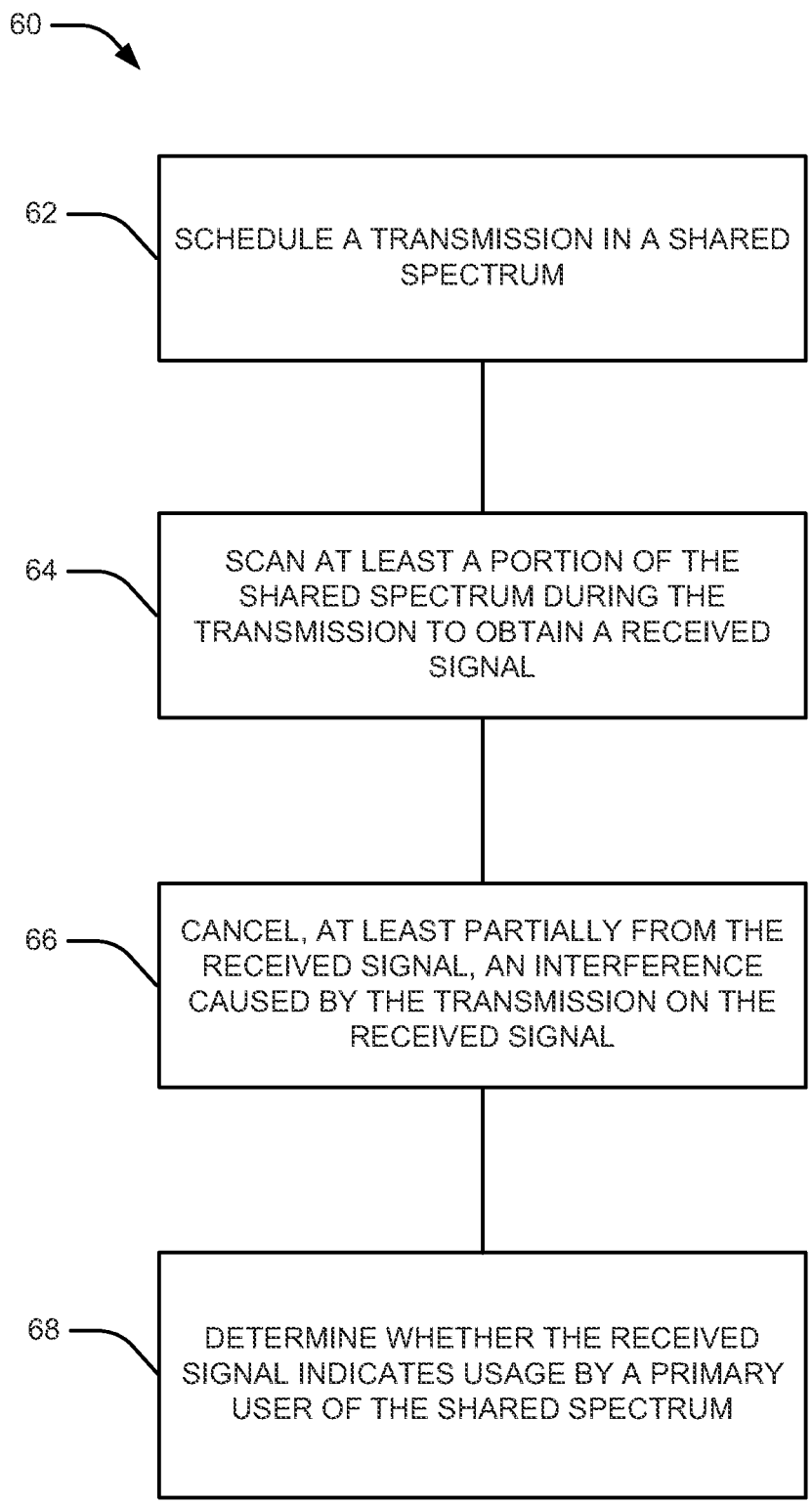
FIG. 2 is a flow diagram illustrating aspects of a method for concurrently transmitting during primary user detection.

FIG. 2 illustrates an example methodology 60 for adaptive self-interference cancellation in a shared spectrum for concurrently transmitting during primary user detection. In an aspect, at block 62, methodology 60 may include scheduling a transmission in a shared spectrum. For example, the scheduling component 34 may schedule the transmission in the shared spectrum. The scheduling component 34 may schedule transmission periods and primary user detection periods based on regulatory requirements. For example, radar detection periods may be scheduled to allow detection of a radar device (e.g., radar device 12 of FIG. 1), which may operate or be designated us a primary user of a channel in the shared spectrum. The scheduling component 34 may schedule a transmission period concurrently with primary user detection period. In an aspect, the concurrently scheduled transmission may be a transmission type that can be cancelled by a SIC circuit 32 to allow creation of a virtual transmission gap where the interference caused by the transmission on a primary user signal can be cancelled to allow detection of the primary user.

In an aspect, at block 64, the methodology 60 may include scanning at least a portion of the shared spectrum during the transmission to obtain a received signal. For example, the receiver 42 of FIG. 1 may scan at least a portion of the shared spectrum during the transmission to obtain a received signal. The transmitter 40 may transmit the data scheduled for the transmission. The receiver 42 may listen for a received signal during the primary user detection period concurrently with the transmission.

In an aspect, at block 66, the methodology 60 may include cancelling, at least partially from the received signal, an interference caused by the transmission on the received signal. For example, the SIC circuit 32 may cancel, at least partially from the received signal, an interference caused by the transmission on the received signal. The SIC circuit 32 may obtain the transmitted SISO transmission from the transmitter 40 and apply self-interference cancellation to the signal received by receiver 42. The SIC circuit 32 may be tuned based on parameters used for the transmission. For example, the SIC circuit 32 may be tuned based on parameters of a transmitting antenna. The SIC circuit may not need to completely cancel all self-interference. Rather, the SIC circuit 32 may reduce the self-interference (e.g., the interference caused by the transmission) to a level where use of radar or some other primary user is detectable. For example, the SIC circuit 32 may reduce the level of self-interference sufficiently to detect radar usage within a geographic area defined by regulatory requirements. The amount of self-interference cancellation may be configured by adjusting various parameters of the SIC circuit 32.

Figure 3:
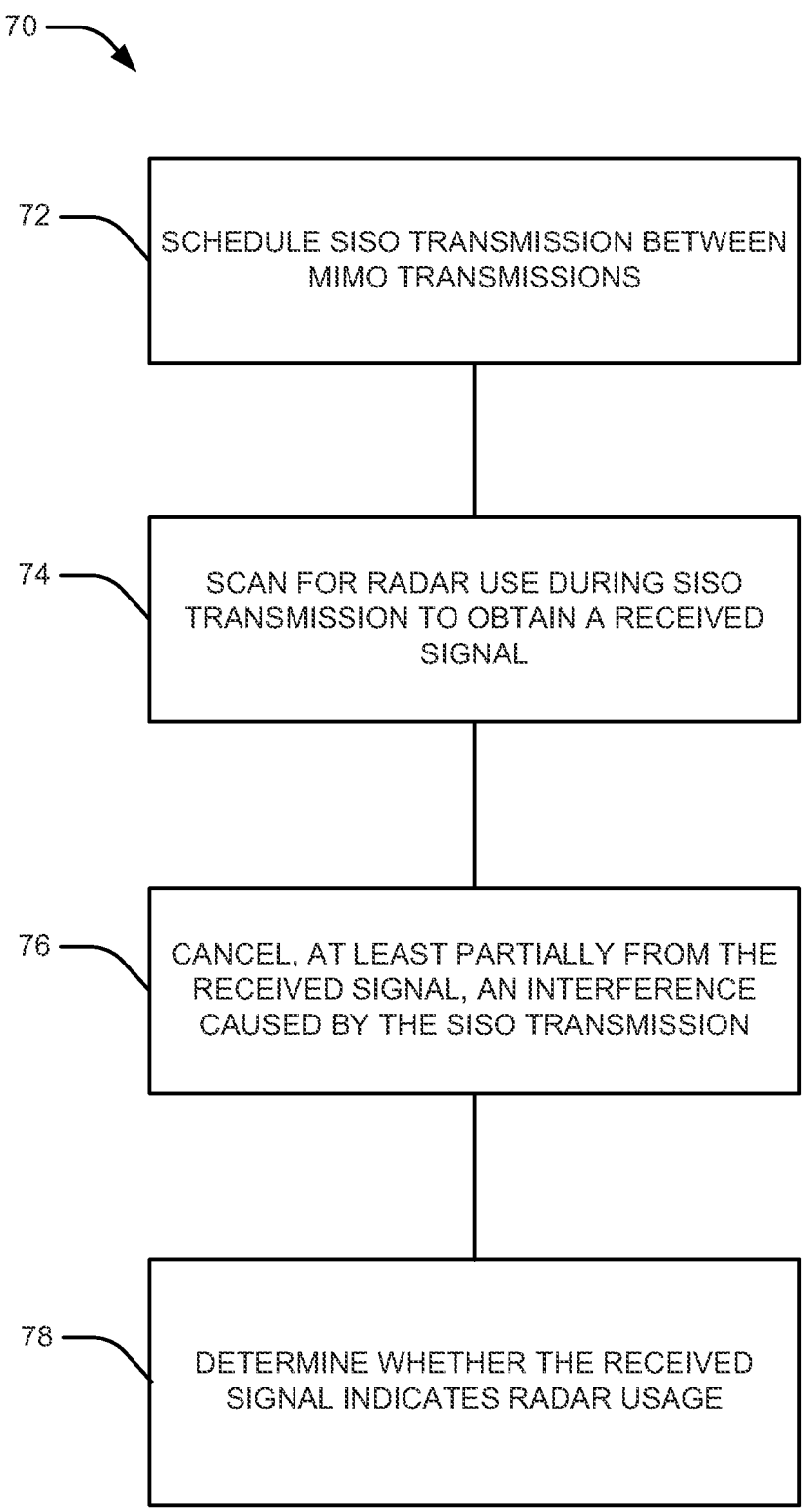
FIG. 3 is a flow diagram illustrating aspects of a method for concurrently transmitting during radar detection.

In an aspect, at block 68, the methodology 60 may include determining whether the received signal indicates usage by a primary user of the shared spectrum. The DFS component 30 may determine whether the received signal indicates usage by a primary user of the shared spectrum. The DFS component 30 may further perform dynamic frequency selection if usage by a primary user is detected. For example, the DFS component 30 may select a different frequency or channel for small cell node 14 and/or UEs FIG. 3 illustrates an example methodology 70 for adaptive self-interference cancellation in an unlicensed spectrum for concurrent transmission during radar detection. In an aspect, at block 72, methodology 70 may include scheduling a SISO transmission between MIMO transmissions. For example, the scheduling component 34 may schedule a SISO transmission between MIMO transmissions. A period between the MIMO transmissions may be a radar detection period. The scheduling component 34 may schedule the radar detection periods and the transmission periods. The radar detection periods may be scheduled based on regulatory requirements. For example, the radar detection periods may be scheduled to allow detection of a radar device designated as a primary user of a channel. The MIMO transmissions may be a preferred transmission type for a wireless device such as small cell 16. The SISO transmissions may be scheduled to allow creation of a virtual transmission gap where self-interference can be cancelled to allow detection of a primary user.

In an aspect, at block 74, the methodology 70 may include scanning for radar use during the SISO transmission to obtain a received signal. For example, the receiver 42 may scan for radar use during the SISO transmission to obtain a received signal. The transmitter 40 may transmit the data scheduled for the SISO transmission. The receiver 42 may listen for a received signal during the radar detection period concurrently with the SISO transmission.

In an aspect, at block 76, the methodology 70 may include cancelling, at least partially from the received signal, an interference caused by the SISO transmission. For example, he SIC circuit 32 may cancel, at least partially from the received signal, an interference caused by the SISO transmission. Block 76 may be similar to block 66 (FIG. 2) discussed above.

In an aspect, at block 78, the methodology 70 may include determining whether the received signal indicates radar usage. For example, the DFS component 30 may determine whether the received signal indicates radar usage. The DFS component 30 may further perform dynamic frequency selection if radar usage is detected. For example, the DFS component 30 may select a different frequency or channel for small cell node 14 and/or UEs 18, 20.

Figure 4:
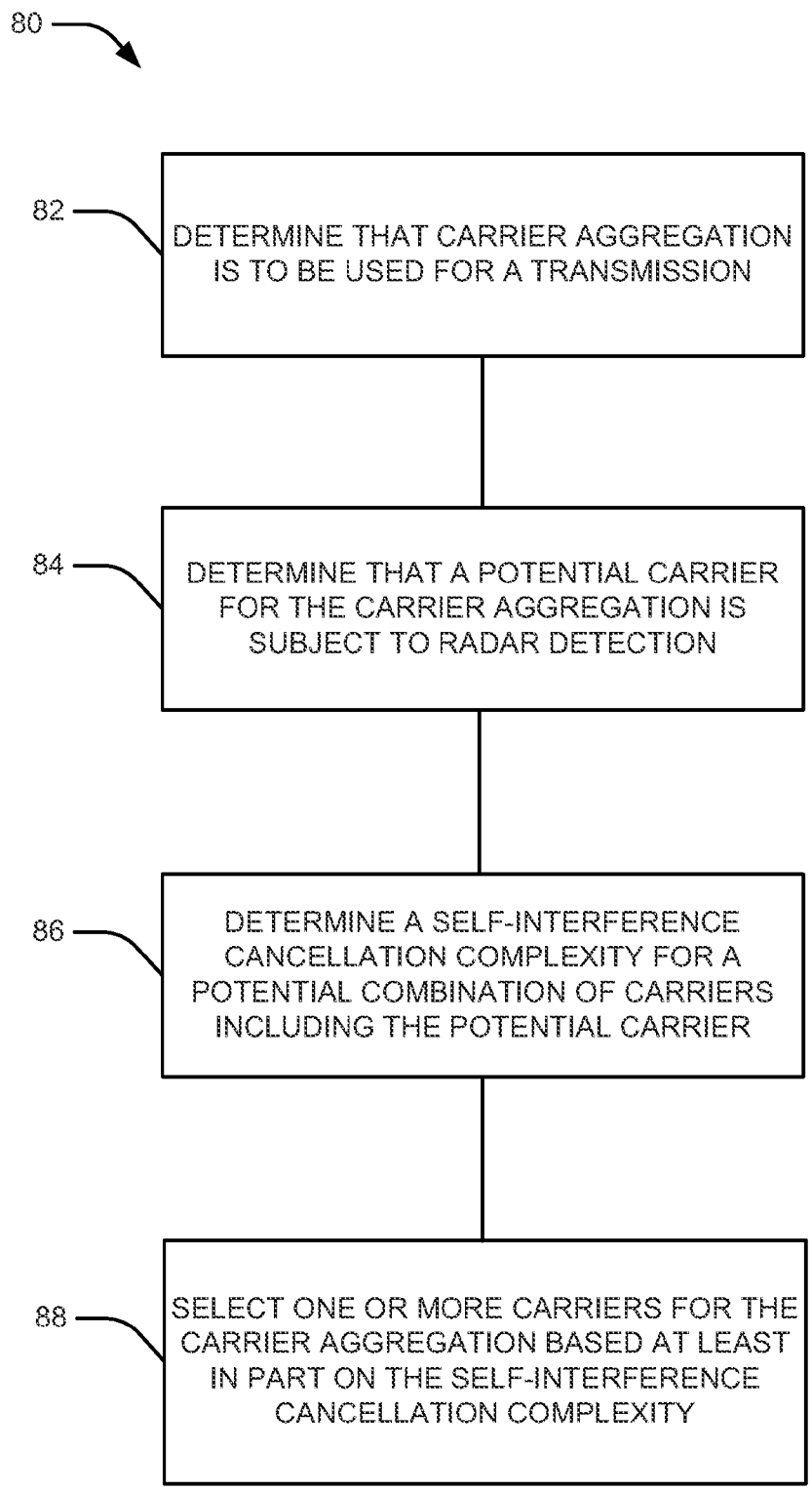
FIG. 4 is a flow diagram illustrating aspects of a method for concurrently transmitting during radar detection.

FIG. 4 illustrates an example methodology 80 for adaptive self-interference cancellation in an unlicensed spectrum for concurrent transmission during radar detection. In block 82, the methodology 80 may include determining that carrier aggregation is to be used for a transmission. The scheduling component 34 may determine whether carrier aggregation is to be used for the transmission. The scheduling component 34 may determine the use of carrier aggregation for one or more transmissions.

In block 84, the methodology 80 may include determining that a potential carrier for the carrier aggregation is subject to radar detection. For example, the channel selection component 38 may determine whether a potential carrier is subject to radar detection. The channel selection component 38 may determine whether a potential carrier is subject to radar detection based on, for example, regulatory requirements or standard requirements. The channel selection component 38 may determine that a potential carrier is subject to radar detection by determining that the potential carrier is in a channel subject to radar detection.

In block 86, the methodology 80 may include determining a self-interference cancellation complexity for a potential combination of carriers including the potential carrier. For example, the complexity of the self-interference cancellation may be determined based on the configuration of SIC circuit 32. In an aspect, a combination of carriers including inter-band carriers may have a relatively low complexity because the SIC circuit 32 may include a filter capable of removing at least non-linear self-interference. In an aspect, a combination of carriers including contiguous intra-band carriers may also be relatively low complexity. A transmission signal using contiguous carriers may be similar to a wide-band signal using a single carrier for self-interference cancellation purposes. In an aspect, a combination of carriers using non-contiguous intra-band carriers may be relatively difficult to cancel. A transmission using non-contiguous carriers may result in non-linear interference, which may be difficult to cancel. In an aspect, SIC cancellation circuit 32 may be unable to adequately cancel non-linear interference. In such a case, the scheduling component 34 may need to schedule transmission gaps having no transmissions for the radar detection periods.

In block 88, the methodology 80 may include selecting one or more carriers for carrier aggregation based at least in part on the self-interference cancellation complexity. For example, the channel selection component 38 may select the one or more carriers to use for carrier aggregation. The channel selection component 38 may also select the channels including the selected carriers for channel selection purposes. The self-interference cancellation complexity may be considered along with other channel selection factors such as channel interference and link quality to different users.

In an aspect, the methodology 80 may further include aspects of the methodology 60, discussed above. For example, the methodology 80 may further include scanning for radar use (e.g., primary user usage) during a transmission using carrier aggregation to obtain a received signal. The methodology 80 may also include cancelling, at least partially, interference caused by the transmission from the received signal using self-interference cancellation circuitry. The methodology 80 may also include determining whether the received signal indicates radar usage.

Figure 5:
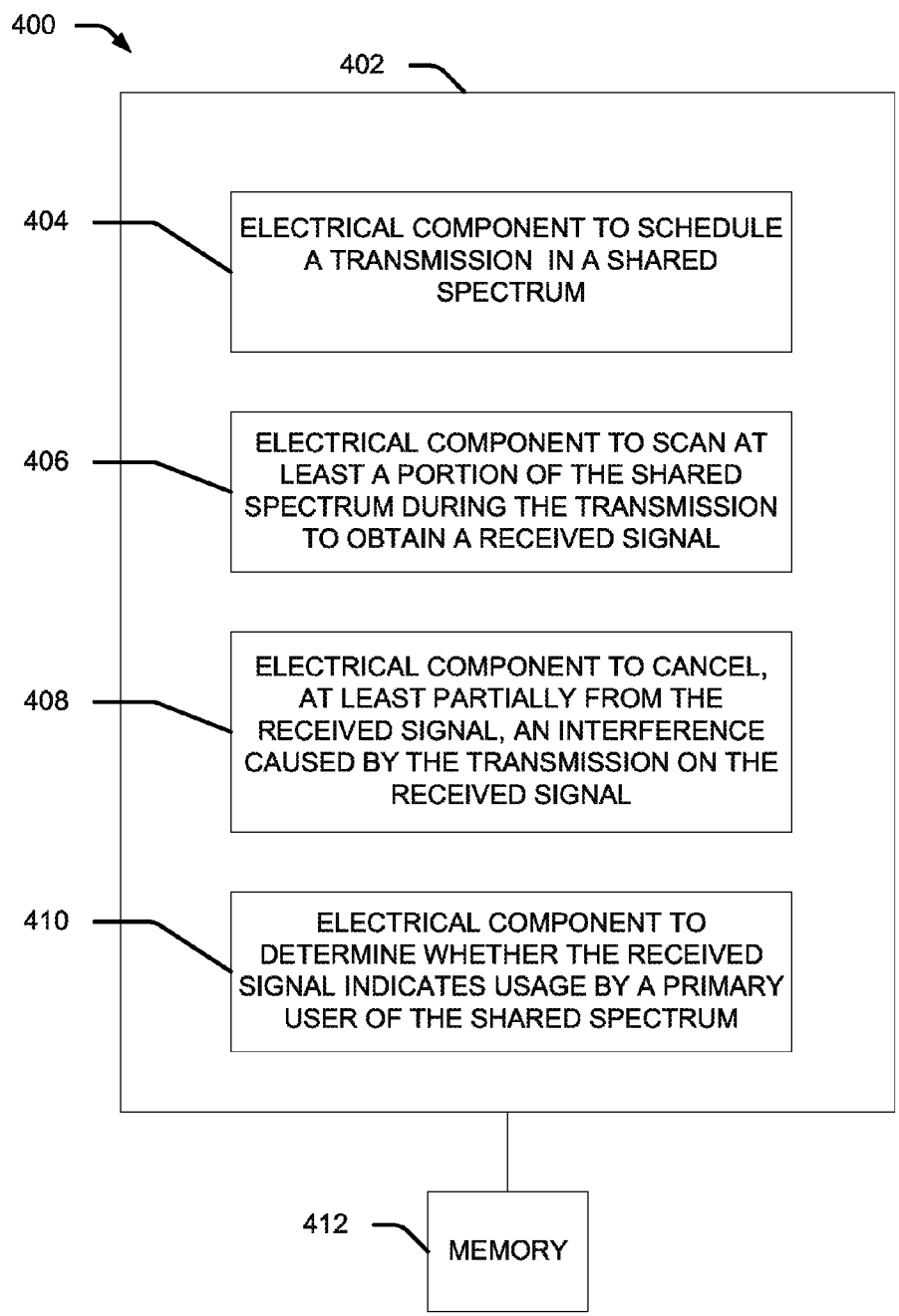
FIG. 5 is a block diagram illustrating aspects of a logical grouping of electrical components as contemplated by the present disclosure.

Referring to FIG. 5, an example system 400 is displayed for selectively using self-interference cancellation to perform detection of a primary user while concurrently transmitting. For example, system 400 can reside at least partially within small cell node 16 (FIG. 1). Other wireless devices such as, for example, UEs 18 and 20 may also include a system 400 for selectively using self-interference cancellation to perform radar detection while concurrently transmitting. It is to be appreciated that system 400 is represented as including functional blocks, which can be functional blocks that represent functions implemented by a processor, software, or combination thereof (for example, firmware). System 400 includes a logical grouping 402 of electrical components that can act in conjunction. For instance, logical grouping 402 can include an electrical component 404 for scheduling a transmission in a shared spectrum. In an aspect, electrical component 404 may comprise a scheduling component 34 (FIG. 1).

Additionally, logical grouping 402 can include an electrical component 406 for scanning at least a portion of the shared spectrum during the transmission to obtain a received signal. In an aspect, the electrical component 406 may comprise receiver 42 (FIG. 1).

Additionally, logical grouping 402 can include an electrical component 408 for canceling, at least partially from the received signal, an interference caused by the transmission on the received signal. The electrical component 408 may perform the cancelling by processing the received signal using self-interference cancellation circuitry. In an aspect, the electrical component 408 may comprise SIC circuit 32 (FIG. 1).

Additionally, logical grouping 402 can include an electrical component 410 for determining whether the received signal indicates usage by a primary user of the shared spectrum. In arm aspect, the electrical component 410 may comprise DFS component 30 (FIG. 1).

Additionally, system 400 can include a memory 412 that retains instructions for executing functions associated with the electrical components 404, 406, 408, and 410 stores data used or obtained by the electrical components 404, 406, 408, and 410. While shown as being external to memory 412, it is to be understood that one or more of the electrical components 404, 406, 408, and 410 can exist within memory 408. In one example, electrical components 404, 406, 408, and 410 can comprise at least one processor, or each electrical component 404, 406, 408, and 410 can be a corresponding module of at least one processor. Moreover, in an additional or alternative example, electrical components 404, 406, 408, and 410 can be a computer program product including a computer readable medium, where each electrical component 404, 406, 408, and 410 can be corresponding code.

Figure 6:
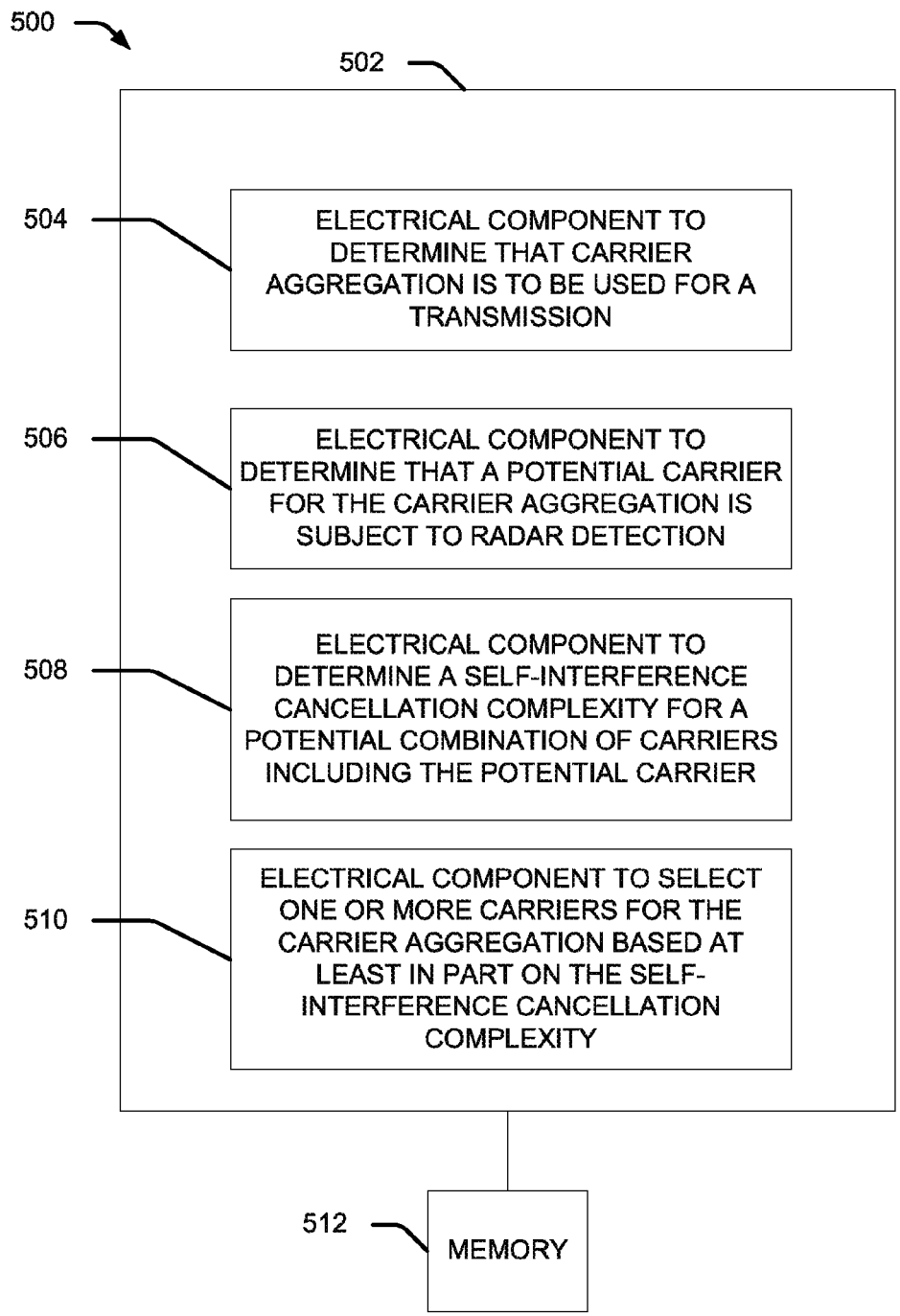
FIG. 6 is another block diagram illustrating aspects of a logical grouping of electrical components as contemplated by the present disclosure.

Referring to FIG. 6, an example system 500 is displayed for selectively using self-interference cancellation to perform radar detection while concurrently transmitting. For example, system 500 can reside at least partially within small cell node 16 (FIG. 1). It is to be appreciated that system 500 is represented as including functional blocks, which can be functional blocks that represent functions implemented by a processor, software, or combination thereof (for example, firmware). System 500 includes a logical grouping 502 of electrical components that can act in conjunction. For instance, logical grouping 502 can include an electrical component 504 for determining that carrier aggregation is to be used for a transmission. In an aspect, electrical component 504 may comprise a scheduling component 34 (FIG. 1).

Additionally, logical grouping 502 can include an electrical component 506 for determining that a potential carrier for the carrier aggregation is subject to radar detection. In an aspect, the electrical component 506 may comprise DFS component 30 (FIG. 1).

Additionally, logical grouping 502 can include an electrical component 508 for determining a self-interference cancellation complexity for a potential combination of carriers including the potential carrier. In an aspect, the electrical component 508 may comprise SIC circuit 32 (FIG. 1).

Additionally, logical grouping 502 can include an electrical component 510 for selecting one or more carriers for the carrier aggregation based at least in part on the self-interference cancellation complexity. In an aspect, the electrical component 510 may comprise channel selection component 38 (FIG. 1).

Additionally, system 500 can include a memory 512 that retains instructions for executing functions associated with the electrical components 504, 506, 508, and 510 stores data used or obtained by the electrical components 504, 506, 508, and 510. While shown as being external to memory 512, it is to be understood that one or more of the electrical components 504, 506, 508, and 510 can exist within memory 508. In one example, electrical components 504, 506, 508, and 510 can comprise at least one processor, or each electrical component 504, 506, 508, and 510 can be a corresponding module of at least one processor. Moreover, in an additional or alternative example, electrical components 504, 506, 508, and 510 can be a computer program product including a computer readable medium, where each electrical component 504, 506, 508, and 510 can be corresponding code.

Figure 7:
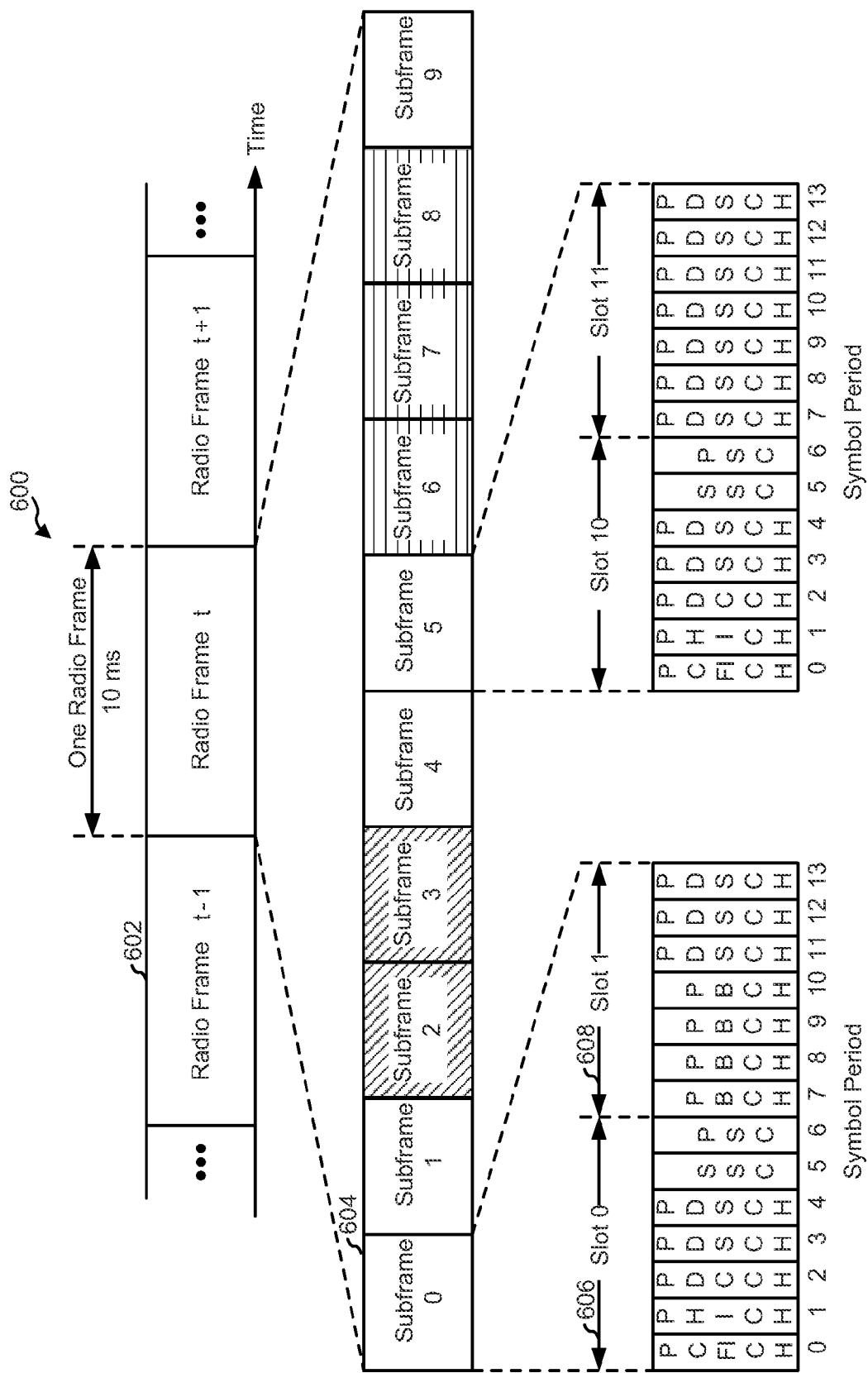
FIG. 7 is a block diagram conceptually illustrating an example of a downlink frame structure in a telecommunications system in accordance with an aspect of the present disclosure.

FIG. 7 is a block diagram conceptually illustrating an example of a downlink frame structure in a telecommunications system in accordance with an aspect of the present disclosure. The transmission timeline for the downlink may be partitioned into units of radio frames 602. Each radio frame 602 may have a predetermined duration (e.g., 10 milliseconds (ms)) and may be partitioned into 10 sub-frames 604 with indices of 0 through 9. Each sub-frame 604 may include two slots 606 and 608. Each radio frame may thus include 20 slots with indices of 0 through 19. Each slot may include L symbol periods, e.g., 7 symbol periods for a normal cyclic prefix (as shown in FIG. 6) or 14 symbol periods for an extended cyclic prefix (not shown). The 2L symbol periods in each sub-frame 604 may be assigned indices of 0 through 2L-1. The available time frequency resources may be partitioned into resource blocks. Each resource block may cover N subcarriers (e.g., 12 subcarriers) in one slot.

As discussed above, a primary user detection period may be scheduled at a subframe level. For example, as illustrated in FIG. 7, contiguous subframes 2 and 3 may be scheduled as a primary user detection period. During subframes 2 and 3, SISO transmissions may be scheduled. Likewise, another primary user detection period may be scheduled for subframes 7, 8, and 9. Depending on the traffic load, the subframes 6, 7, and 8 may be a natural transmission gap where no transmissions are scheduled. Accordingly, SIC circuit 32 may be bypassed or disabled during subframes 7, 8, and 9. In another aspect, SISO transmissions may also be scheduled for subframes 7, 8, and 9. Other subframes, such as subframes 0, 1, 4, 5, and 9 may be used for MIMO transmissions.

Figure 8:
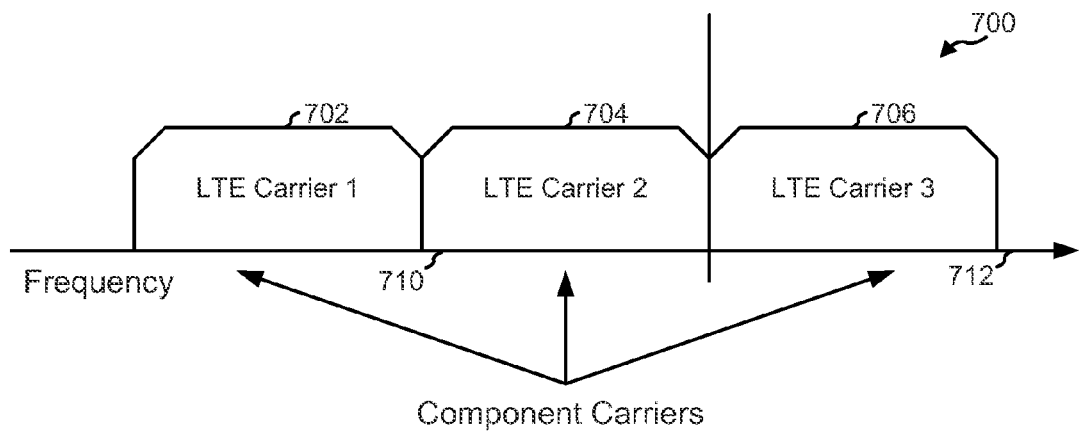
FIG. 8 illustrates a continuous carrier aggregation type in accordance with an aspect of the present disclosure.
Figure 9:
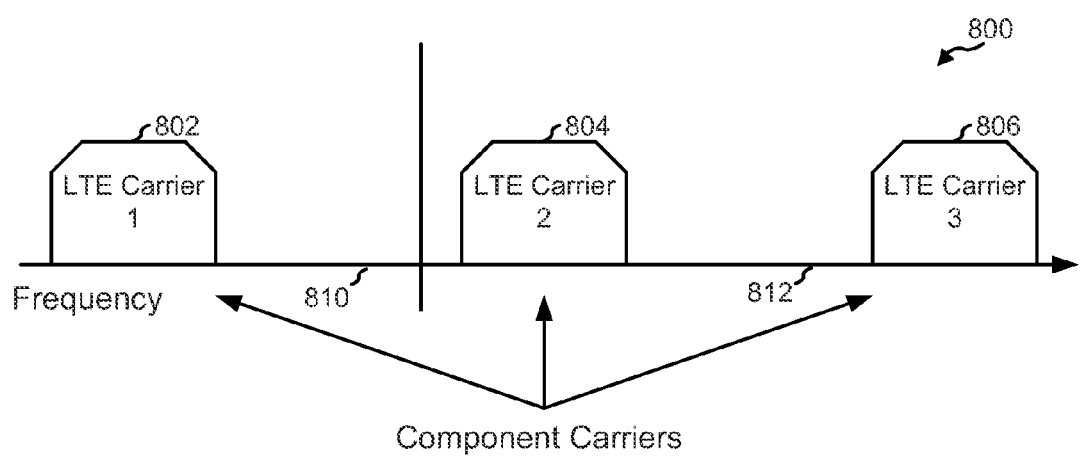
FIG. 9 illustrates a non-continuous carrier aggregation type in accordance with an aspect of the present disclosure.

UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA, which are illustrated in FIGS. 8 and 9, respectively. Continuous CA occurs when multiple available component carriers (e.g., LTE carrier 1,LTE carrier 2, LTE carrier 3) are adjacent to each other (as illustrated in FIG. 8), On the other hand, non-continuous CA occurs when multiple non-adjacent available component carriers (LTE carrier 1, LTE carrier 2, LTE carrier 3) are separated along the frequency band (as illustrated in FIG. 9). Both non-continuous and continuous CA may aggregate multiple component carriers to serve a single unit of LTE-Advanced UEs. In various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support may be referred to as "associated secondary carriers." For example, the UE may aggregate control functions such as those provided by the optional dedicated channel (DCH), the nonscheduled grants, a physical uplink control channel (PUCCH), and/or a physical downlink control channel (PDCCH).

In a portion of unlicensed spectrum, the 5 GHz band for example, only certain bands or portions of the spectrum may be subject to radar detection and DFS. For example, in FIG. 8, portion 710 may be a U-NII 1 band, which does not require DFS while portion 712 may be a U-NII 2 band, which does require DFS. As discussed above, if a potential component carrier, for example LTE carrier 3, is within a portion of spectrum for which DFS is required, self-interference cancellation may be used to sufficiently reduce the interference to allow for radar detection. The aggregation of contiguous carriers as illustrated in FIG. 8 may be relatively simple.

In FIG. 9, portion 810 may be a U-NII 1 band, which does not require DFS while portion 812 may be a U-NII 2 band, which does require DFS. As illustrated, potential component carriers 804 and 806 may both be located in the portion 812 requiring DFS, which carrier component 802 is located in a portion 810 where DFS is not required. As discussed above, self-interference cancellation may be complex in the case of intra-band non-contiguous carrier aggregation. On the other hand, SIC circuit 32 may include a filter to make self-interference cancelation non-contiguous inter-band less complex. Accordingly self-interference cancellation of a transmission using component carriers 804 and 806 may more complex than self-interference cancellation of a transmission using component carriers 802 and 804.

Figure 10:
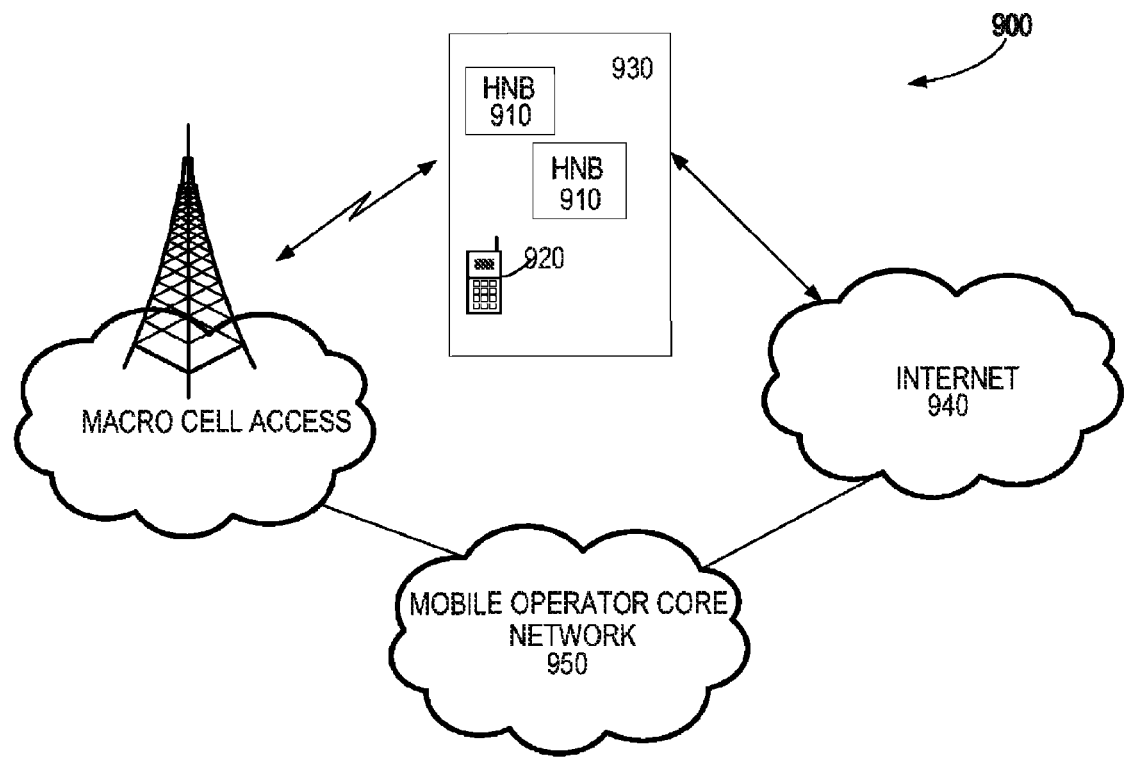
FIG. 10 illustrates an exemplary communication system to enable deployment of access point base stations within a network environment.

FIG. 10 illustrates an exemplary communication system to enable deployment of access point base stations within a network environment. As shown in FIG. 10, system 900 includes multiple access point base stations or Home Node B units (HNBs) or small cells, such as, for example, HNBs 910, each being installed in a corresponding small scale network environment, such as, for example, in one or more user residences 930, and being configured to serve associated, as well as alien, user equipment (UE) 920. The HNB 910 may be an example of a small cell node 16 including a DFS component 30 for adaptively using self-interference cancellation for concurrent transmission and primary user detection. Each HNB 910 is further coupled to the Internet 940 and a mobile operator core network 950 via a DSL router (not shown) or, alternatively, a cable modem (not shown).

Although embodiments described he in use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of the HNB 910 subscribes to mobile service, such as, for example, 3G mobile service, offered through the mobile operator core network 950, and the UE 920 is capable to operate both in macro cellular environment and in residential small scale network environment. Thus, the HNB 910 is backward compatible with any existing UE 920.

Furthermore, in addition to the macro cell mobile network 950, the UE 920 can only be served by a predetermined number of HNBs 910, namely the HNBs 910 that reside within the user's residence 930, and cannot be in a soft handover state with the macro network 950. The UE 220 can communicate either with the macro network 950 or the HNBs 910, but not both simultaneously. As long as the UE 920 is authorized to communicate with the HNB 910, within the user's residence it is desired that the UE 920 communicate only with the associated HNBs 910.

Figure 11:
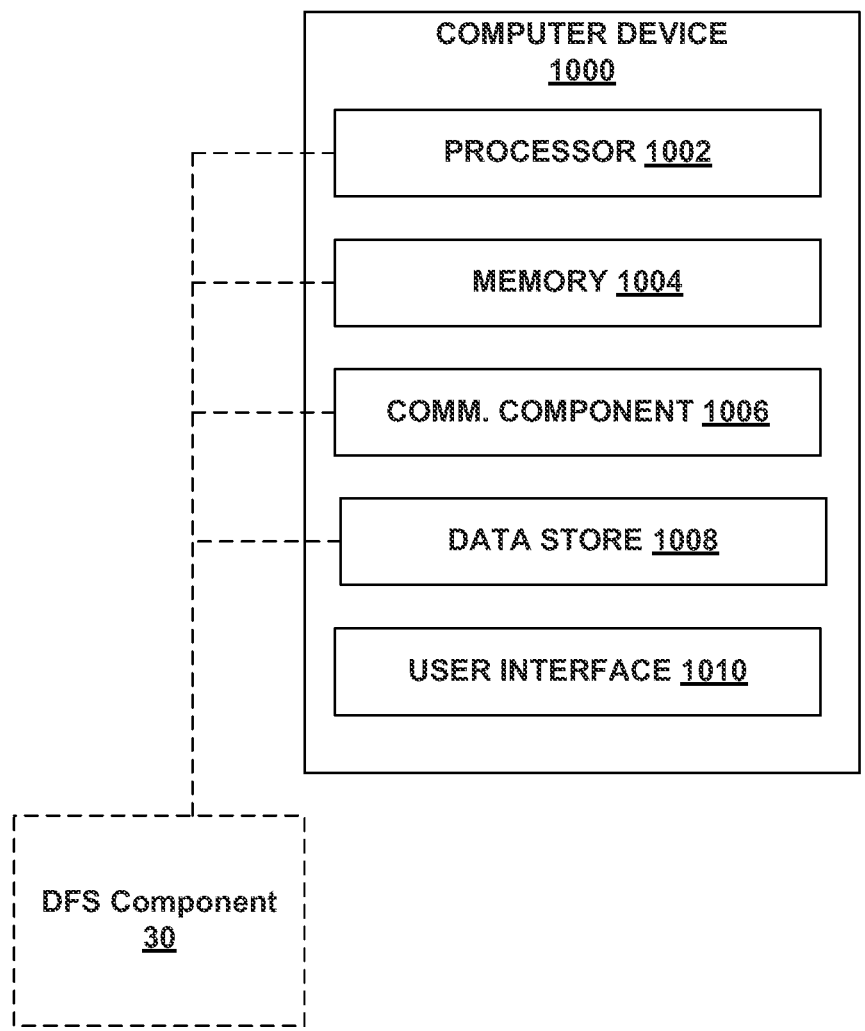
FIG. 11 is a block diagram illustrating aspects of a computer device according to the present disclosure.

Referring to FIG. 11, in one aspect, one or more of small cell node 16 (FIG. 1) and/or user equipments (UEs) 18, 20 (FIG. 1), including DFS component 30 (FIG. 1) may be represented by a specially programmed or configured computer device 1000. In one aspect of implementation, computer device 1000 may include DFS component 30 (FIG. 1), such as in specially programmed computer readable instructions or code, firmware, hardware, or some combination thereof. Computer device 1000 includes a processor 1002 for carrying out processing functions associated with one or more of components and functions described herein. Processor 1002 can include a single or multiple set of processors or multi-core processors. Moreover, processor 1002 can be implemented as an integrated processing system and/or a distributed processing system.

Computer device 1000 further includes a memory 1004, such as for storing data used herein and/or local versions of applications being executed by processor 1002. Memory 1004 can include any type of memory usable by a computer, such as random access memory (RAM), read only memory (ROM), tapes, magnetic discs, optical discs, volatile memory, non-volatile memory, and any combination thereof.

Further, computer device 1000 includes a communications component 1006 that provides for establishing and maintaining communications with one or more parties utilizing hardware, software, and services as described herein. Communications component 1006 may carry communications between components on computer device 1000, as well as between computer device 1000 and external devices, such as devices located across a communications network and/or devices serially or locally connected to computer device 1000. For example, communications component 1006 may include one or more buses, and may further include transmit chain components and receive chain components associated with a transmitter and receiver, respectively, or a transceiver, operable for interfacing with external devices. In an additional aspect, communications component 1006 may be configured to receive one or more pages from one or more subscriber networks. In a further aspect, such a page may correspond to the second subscription and may be received via the first technology type communication services.

Additionally, computer device 1000 may further include a data store 1008, which can be any suitable combination of hardware and/or software, that provides for mass storage of information, databases, and programs employed in connection with aspects described herein. For example, data store 1008 may be a data repository for applications not currently being executed by processor 1002 and/or any threshold values or finger position values.

Computer device 1000 may additionally include a user interface component 1010 operable to receive inputs from a user of computer device 1000 and further operable to generate outputs for presentation to the user. User interface component 1010 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1010 may include one or more output devices, including but not limited to a display, a speaker, a haptic feedback mechanism, a printer, any other mechanism capable of presenting an output to a user, or any combination thereof.

Figure 12:
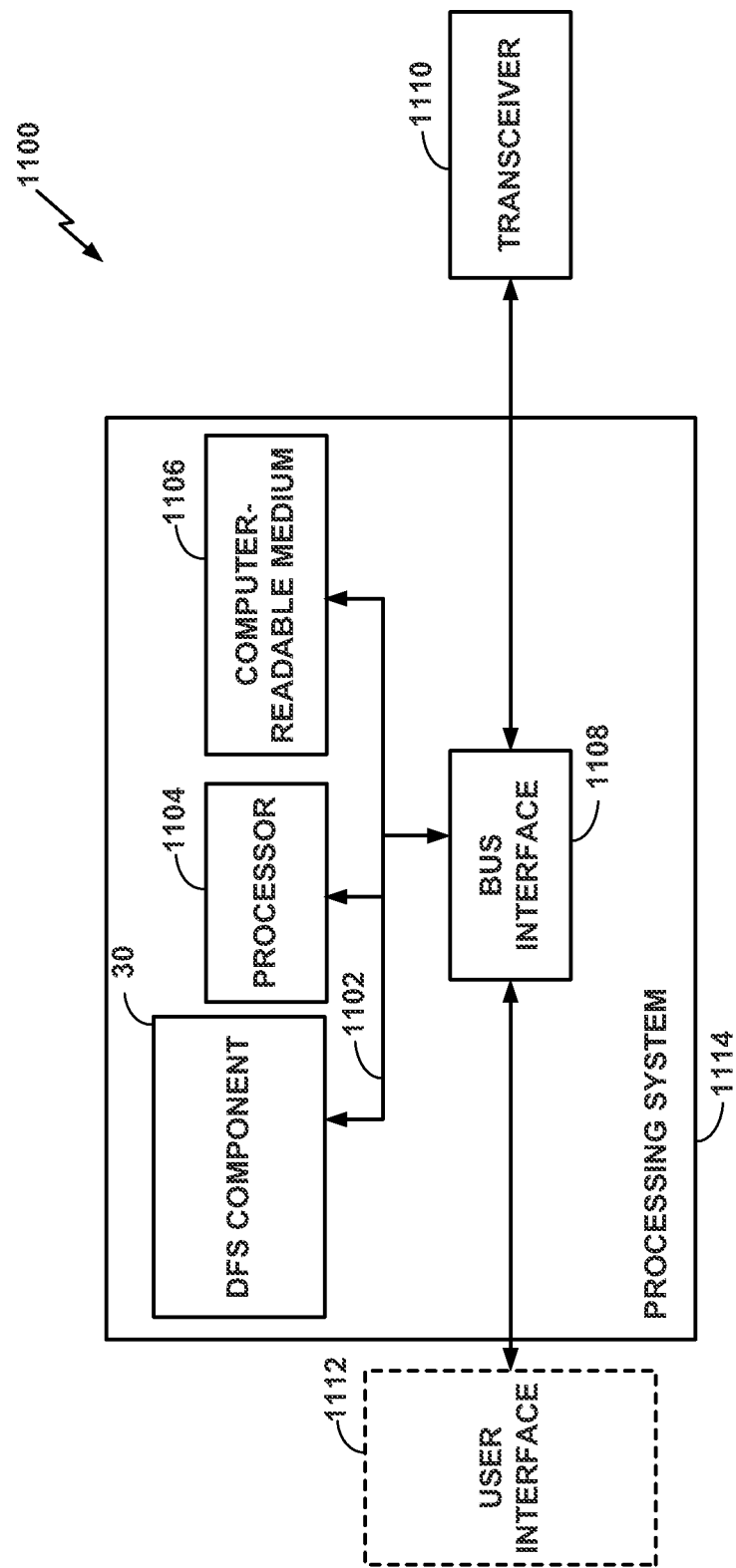
FIG. 12 is a block diagram illustrating an example of a hardware implementation for an apparatus employing a processing system.

FIG. 12 is a block diagram illustrating an example of a hardware implementation for an apparatus 1100, for example, including DFS component 30 of FIG. 1 and employing a processing system 1114 for carrying out aspects of the present disclosure, such as method for optimizing coverage area of a small cell. In this example, the processing system 1114 may be implemented with bus architecture, represented generally by a bus 1102. The bus 1102 may include any number of interconnecting buses and bridges depending on the specific application of the processing system 1114 and the overall design constraints. The bus 1102 links together various circuits including one or more processors, represented generally by the processor 1104, computer-readable media, represented generally by the computer-readable medium 1106, and one or more components described herein, such as, but not limited to, DFS component 30 (FIG. 1). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processor 1104 is responsible for managing the bus 1102 and general processing, including the execution of software stored on the computer-readable medium 1107. The software, when executed by the processor 1104, causes the processing system 1114 to perform the various functions described infra for any particular apparatus. The computer-readable medium 1107 may also be used for storing data that is manipulated by the processor 1104 when executing software. DFS component 30 as described above may be implemented in whole or in part by processor 1104, or by computer-readable medium 1106, or by any combination of processor 1104 and computer-readable medium 1106.

Figure 13:
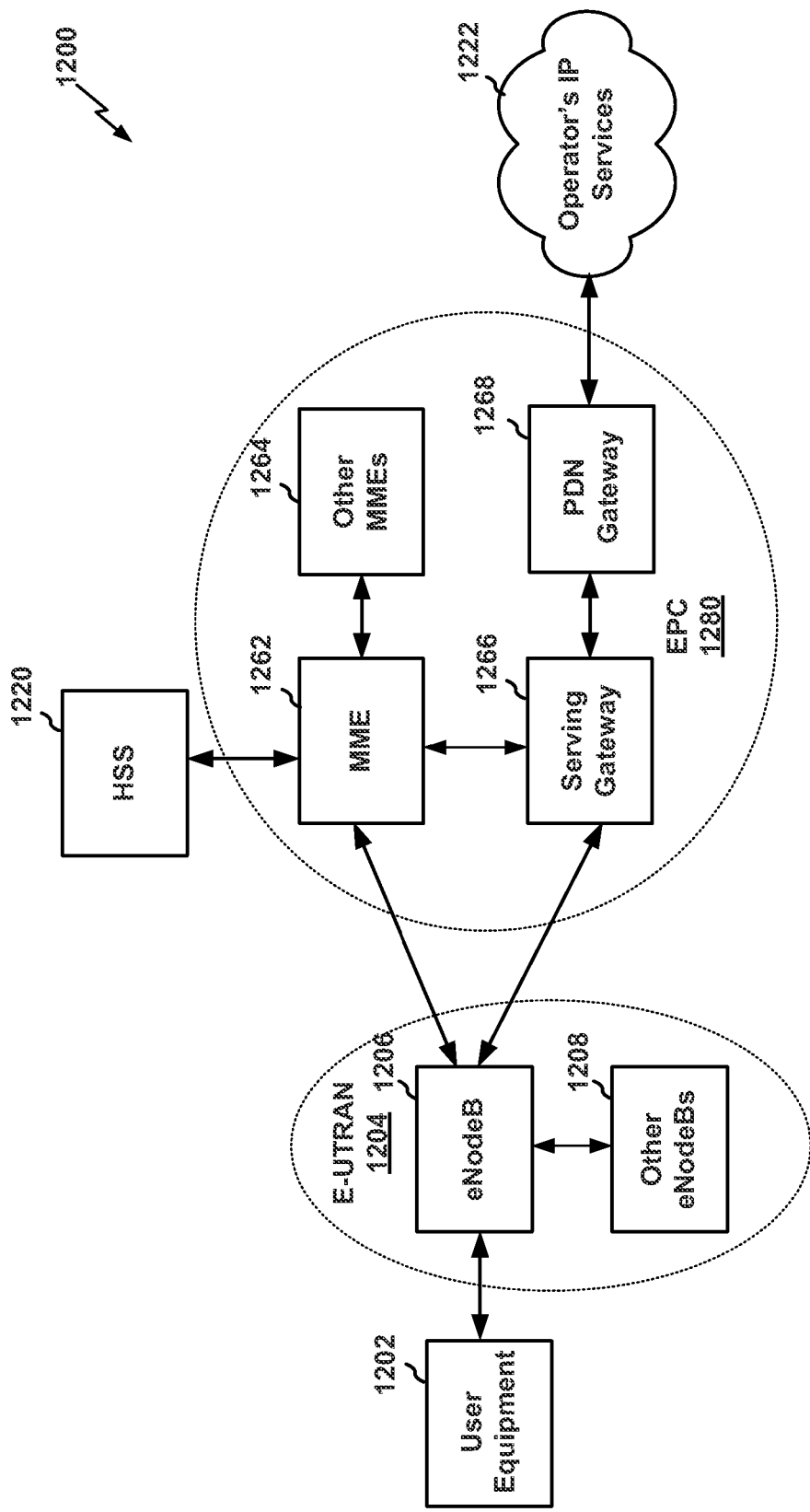
FIG. 13 is a block diagram conceptually illustrating an example of a telecommunications system.

FIG. 13 is a diagram illustrating a long term evolution (LTE) network architecture 1200 employing various apparatuses of wireless communication system 10 (FIG. 1) and may include one or more small cell nodes 16 (FIG. 1). The LTE network architecture 1200 may be referred to as an Evolved Packet System (EPS) 1200. EPS 1200 may include one or more user equipment (UE) 1202, an Evolved UMTS Terrestrial Radio Access Network (E-UTRAN) 1204, an Evolved Packet Core (EPC) 1280, a Home Subscriber Server (HSS) 1220, and an Operator's IP Services 1222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 1206 and other eNBs 1208. The eNB 1206 and 128 may each be an example of a small cell node 16 (FIG. 1) including a DFS component 30 for enabling concurrent transmission and primary user detection using self-interference cancellation. The eNB 1206 provides user and control plane protocol terminations toward the UE 1202. The eNB 1208 may be connected to the other eNBs 1208 via an X2 interface (i.e., backhaul). The eNB 1206 may also be referred to by those skilled in the art as a base station, a base transceiver station, a radio base station, a radio transceiver, a transceiver function, a basic service set (BSS), a small cell, an extended service set (ESS), or some other suitable terminology. The eNB 1206 provides an access point to the EPC 1280 for a UE 1202. Examples of UEs 1202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 1202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 1206 is connected by an S1 interface to the EPC 1280. The EPC 1280 includes a Mobility Management Entity (MME) 1262, other MMEs 1264, a Serving Gateway 1266, and a Packet Data Network (PDN) Gateway 1268. The MME 1262 is the control node that processes the signaling between the UE 1202 and the EPC 1280. Generally, the MME 1262 provides bearer and connection management. All user IP packets are transferred through the Serving Gateway 1266, which itself is connected to the PDN Gateway 1268. The PDN Gateway 1268 provides UE IP address allocation as well as other functions. The PDN Gateway 1268 is connected to the Operator's IP Services 1222. The Operator's IP Services 1222 includes the Internet, the Intranet, an IP Multimedia Subsystem (IMS), and a PS Streaming Service (PSS).

Figure 14:
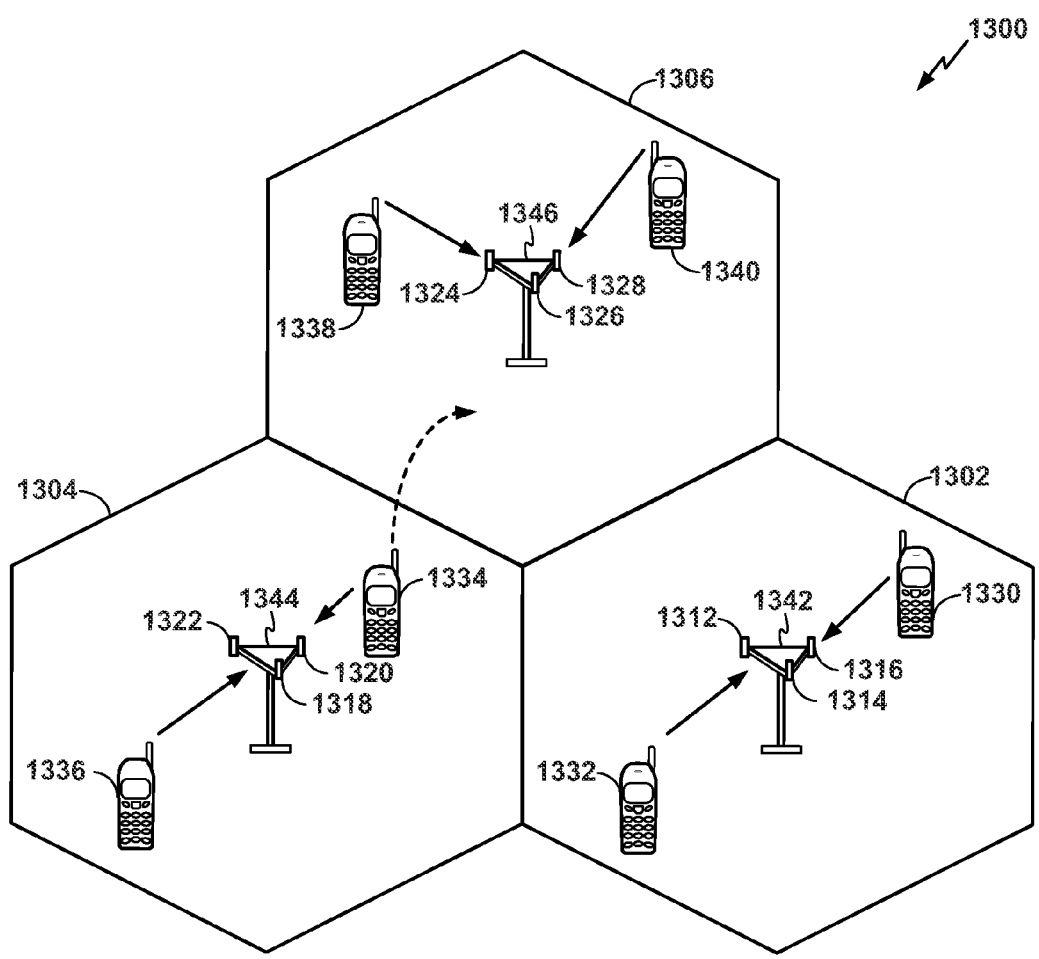
FIG. 14 is a conceptual diagram illustrating an example of an access network.

Referring to FIG. 14, an access network 1300 in a UTRAN architecture is illustrated, and may include one or more base stations or small cell nodes 16 (FIG. 1). The multiple access wireless communication system includes multiple cellular regions (cells), including cells 1302, 1304, and 1306, each of which may include one or more sectors and which may be provided by the small cell node 16 of FIG. 1 having the DFS component 30. The multiple sectors can be formed by groups of antennas with each antenna responsible for communication with UEs in a portion of the cell. For example, in cell 1302, antenna groups 1312, 1314, and 1316 may each correspond to a different sector. In cell 1304, antenna groups 1319, 1320, and 1322 each correspond to a different sector. In cell 1306, antenna groups 1324, 1326, and 1328 each correspond to a different sector. The cells 1302, 1304 and 1306 may include several wireless communication devices, e.g., User Equipment or UEs, for example, including UEs 16 and 18 of FIG. 1, which may be in communication with one or more sectors of each cell 1302, 1304 or 1306. For example, UEs 1330 and 1332 may be in communication with NodeB 1342, UEs 1334 and 1336 may be in communication with NodeB 1344, and UEs 1339 and 1340 can be in communication with NodeB 1346. Here, each NodeB 1342, 1344, 1346 is configured to provide an access point for all the UEs 1330, 1332, 1334, 1336, 1338, 1340 in the respective cells 1302, 1304, and 1306. Additionally, each NodeB 1342, 1344, 1346 and UEs 1330, 1332, 1334, 1336, 1338, 1340 may be UEs 18, 20 of FIG. 1 and may perform the methods outlined herein.

As the UE 1334 moves from the illustrated location in cell 1304 into cell 1306, a serving cell change (SCC) or handover may occur in which communication with the UE 1334 transitions from the cell 1304, which may be referred to as the source cell, to cell 1306, which may be referred to as the target cell. Management of the handover procedure may take place at the UE 1334, at the Node Bs corresponding to the respective cells, at EPC 1280 (FIG. 12), or at another suitable node in the wireless network. For example, during a call with the source cell 1304, or at any other time, the UE 1334 may monitor various parameters of the source cell 1304 as well as various parameters of neighboring cells such as cells 1306 and 1302. Further, depending on the quality of these parameters, the UE 1334 may maintain communication with one or more of the neighboring cells. During this time, the UE 1334 may maintain an Active Set, that is, a list of cells that the UE 1334 is simultaneously connected to (i.e., the UTRA cells that are currently assigning a downlink dedicated physical channel DPCH or fractional downlink dedicated physical channel F-DPCH to the UE 1334 may constitute the Active Set).

Further, the modulation and multiple access scheme employed by the access network 1300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and LIMB are described in documents front the 3GPP2 organization. The actual wireless communication standard and the multiple access technology employed will depend on the specific application and the overall design constraints imposed on the system.

Figure 15:
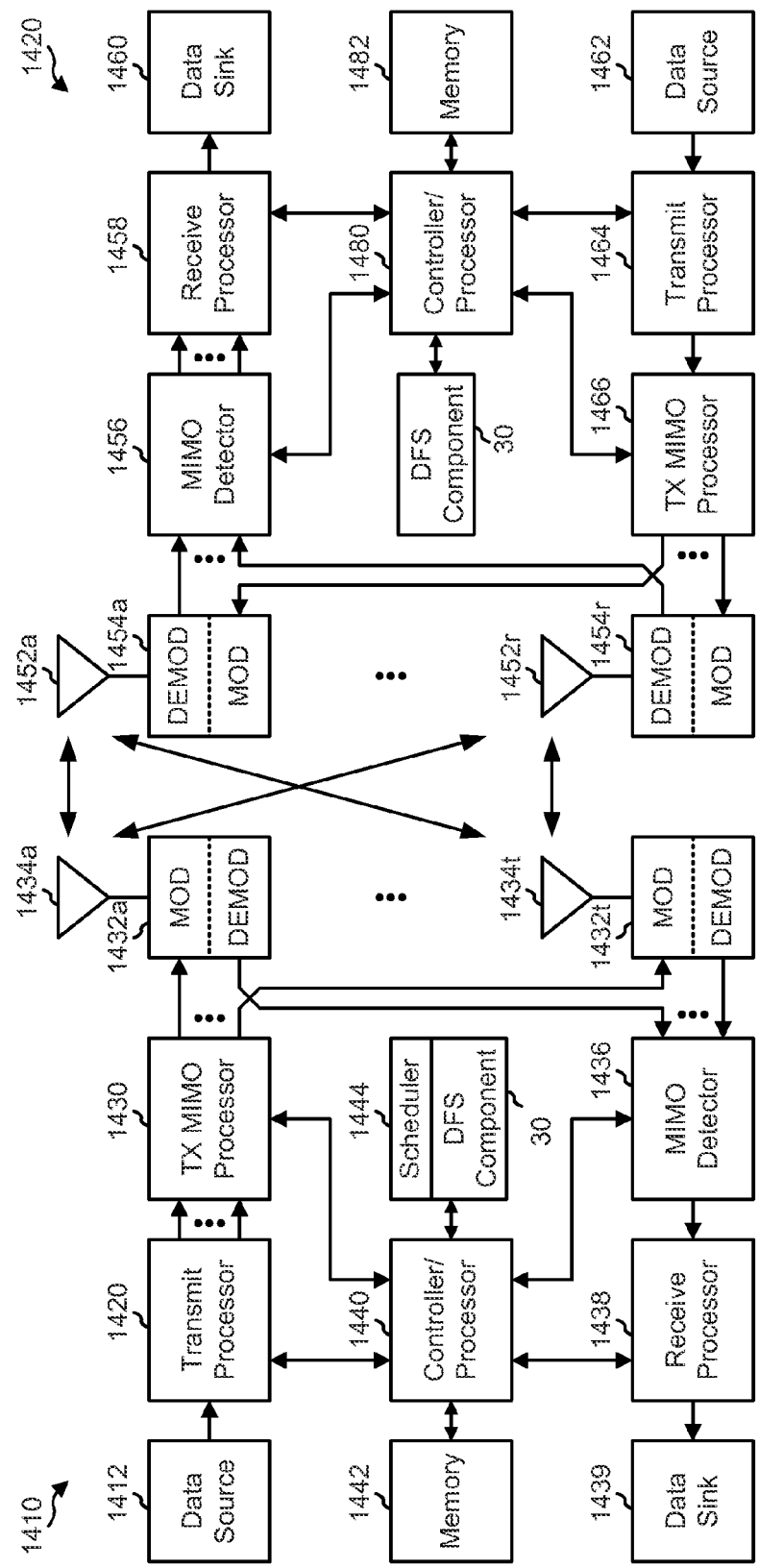
FIG. 15 is a block diagram conceptually illustrating an example of a NodeB in communication with a UE in a telecommunications system.

FIG. 15 is a block diagram conceptually illustrating an exemplary eNodeB 1410 and an exemplary UE 1420 configured in accordance with an aspect of the present disclosure. For example, the base station/eNodeB 1410 and the UE 1420, as shown in FIG. 15, may be one of the small cell node 16 having dynamic frequency selection component 30 and one of the UEs 16 or 18 in FIG. 1, respectively. The base station 1410 may be equipped with antennas $1434_{1-t}$, and the UE 1420 may be equipped with antennas $1452_{1-r}$, wherein t and r are integers greater than or equal to one.

At the base station 1410, a base station transmit processor 1420 may receive data from a base station data source 1412 and control information from a base station controller/processor 1440. The control information may be carried on the PBCH, PCFICH, PHICH, PDCCH, etc. The data may be carried on the PDSCH, etc. The base station transmit processor 1420 may process (e.g., encode and symbol map) the data and control information to obtain data symbols and control symbols, respectively. The base station transmit processor 1420 may also generate reference symbols, e.g., for the PSS, SSS, and cell-specific reference signal (RS). A base station transmit (TX) multiple-input multiple-output (MIMO) processor 1430 may perform spatial processing (e.g., precoding) on the data symbols, the control symbols, and/or the reference symbols, if applicable, and may provide output symbol streams to the base station modulators/demodulators (MODs/DEMODs) $1432_{1-t}$. Each base station modulator/demodulator 1432 may process a respective output symbol stream (e.g., for OFDM, etc.) to obtain an output sample stream. Each base station modulator/demodulator 1432 may further process (e.g., convert to analog, amplify, filter, and upconvert) the output sample stream to obtain a downlink signal. Downlink signals from modulators/demodulators $1432_{1-t}$ may be transmitted via the antennas $1434_{1-t}$, respectively.

At the UE 1420, the UE antennas $1452_{1-r}$ may receive the downlink signals from the base station 1410 and may provide received signals to the UE modulators/demodulators (MODs/DEMODs) $1454_{1-r}$, respectively. Each UE modulator/demodulator 1454 may condition (e.g., filter, amplify, downconvert, and digitize) a respective received signal to obtain input samples. Each UE modulator/demodulator 1454 may further process the input samples (e.g., the OFDM, etc.) to obtain received symbols. A UE MIMO detector 1456 may obtain received symbols from all the UE modulators/demodulators $1454_{1-r}$, and perform MIMO detection on the received symbols if applicable, and provide detected symbols. A UE reception processor 1458 may process (e.g., demodulate, deinterleave, and decode) the detected symbols, provide decoded data for the UE 1420 to a UE data sink 1460, and provide decoded control information to a UE controller/processor 1480.

On the uplink, at the UE 1420, a UE transmit processor 1464 may receive and process data (e.g., for the PUSCH) from a UE data source 1462 and control information (e.g., for the PUCCH) from the UE controller/processor 1480. The UE transmit processor 1464 may also generate reference symbols for a reference signal. The symbols from the UE transmit processor 1464 may be precoded by a UE TX MIMO processor 1466 if applicable, further processed by the UE modulator/demodulators $1454_{1-r}$ (e.g., for SC-FDM, etc.), and transmitted to the base station 1410. At the base station 1410, the uplink signals from the UE 1420 may be received by the base station antennas 1434, processed by the base station modulators/demodulators 1432, detected by a base station MIMO detector 1436 if applicable, and further processed by a base station reception processor 1438 to obtain decoded data and control information sent by the UE 1420. The base station reception processor 1438 may provide the decoded data to a base station data sink 1446 and the decoded control information to the base station controller/processor 1440.

The base station controller/processor 1440 and the UE controller/processor 1480 may direct the operation at the base station 1410 and the UE 1420, respectively. The base station controller/processor 1440 and/or other processors and modules at the base station 1410 may perform or direct, e.g., the execution of various processes for the techniques described herein. The UE controller/processor 1480 and/or other processors and modules at the UE 1420 may also perform or direct, e.g., the execution of the functional blocks illustrated in FIGS. 2, 3, and 4 and/or other processes for the techniques described herein. The base station memory 1442 and the UE memory 1482 may store data and program codes for the base station 1410 and the UE 1420, respectively. A scheduler 1444 may schedule UEs 1420 for data transmission on the downlink and/or uplink. The scheduler 1444 may be a scheduling component 34 (FIG. 1) and be part of a DFS component 30. The DFS component 30 may further include or be implemented by the modulators/demodulators 1432, receive processor 1438, controller/processor 1440, memory 1442, transmit processor 1420, and/or modulators/demodulators 1432. In another aspect, the UE 1420 may also include a DFS component 30, which may be used, for example, for concurrently transmitting in the uplink direction while detecting radar usage or for detecting radar usage while acting as a hotspot or access point.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 145 U.S.C. §112, sixth paragraph, unless the element is expressly recited using the phrase "means for" or, in the case of a method claim, the element is recited using the phrase "step for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication, the method comprising:
    scheduling a transmission, from a first device, in a shared spectrum;
    scanning, at the first device, at least a portion of the shared spectrum during the transmission to obtain a received signal, wherein the transmission and the scanning occur concurrently at the first device;
    cancelling, at least partially from the received signal, an interference caused by the transmission from the first device on the received signal; and
    determining whether a signal resulting from the cancelling the interference caused by the transmission from the first device on the received signal indicates usage by a primary user of the shared spectrum,
    wherein the scheduling of the transmission includes:
        determining that carrier aggregation is to be used for the transmission;
        determining that a potential carrier for the carrier aggregation is subject to usage by the primary user;
        determining a self-interference cancellation complexity for a potential combination of carriers including the potential carrier; and
        selecting one or more carriers for the carrier aggregation based at least in part on the self-interference cancellation complexity.

2. The method of claim 1, wherein the transmission is a single-input single-output (SISO) transmission and scheduling the transmission comprises scheduling the SISO transmission between multiple-input multiple-output (MIMO) transmissions.

3. The method of claim 2, wherein the cancelling includes processing the received signal using a self-interference cancellation circuitry, and wherein the method further comprises:
    determining that a serving load allows scheduling a transmission gap between the MIMO transmissions, wherein the transmission gap has no scheduled transmission; and
    bypassing the processing of the received signal by the self-interference cancellation circuitry during the transmission gap.

4. The method of claim 2, wherein the scheduling is based on a utility function of one or more of a serving load of a transmitting device, throughput of the SISO transmission, and power consumption of cancelling the interference.

5. The method of claim 2, wherein the scheduling includes selecting a user equipment to receive the SISO transmission based on feedback from the user equipment, wherein the feedback indicates that the user equipment is unable to receive a MIMO transmission.

6. The method of claim 2, wherein the scheduling includes selecting a user equipment for the SISO transmission based on a fairness criteria for allocating the SISO transmission and the MIMO transmissions among a plurality of user equipments.

7. The method of claim 2, further comprising selecting from a plurality of antennas, an antenna for the SISO transmission based on spatial characteristics of a recipient of the SISO transmission.

8. The method of claim 7, further comprising storing self-interference cancellation parameters for the plurality of antennas, wherein the cancelling comprises processing the received signal using the self-interference cancellation parameters for the selected antenna.

9. The method of claim 1, further comprising assigning a weight to the potential combination of carriers based on the self-interference cancellation complexity, wherein selecting one or more carriers for the carrier aggregation is further based on weights based on channel interference and link quality of users.

10. The method of claim 9, wherein the weight assigned to the potential combination of carriers based on the self-interference cancellation complexity varies based on a transmission load.

11. The method of claim 9, wherein the weight assigned to the potential combination of carriers based on the self-interference cancellation complexity depends on a loss in system capacity associated with scheduling transmission gaps for detecting the primary user.

12. The method of claim 1, wherein determining that the potential carrier for the carrier aggregation is subject to usage by the primary user comprises determining that the potential carrier is in a channel subject to radar detection.

13. An apparatus for wireless communication, the apparatus comprising:
   means for scheduling, from a first device, a transmission in a shared spectrum;
   means for scanning, at the first device, at least a portion of the shared spectrum during the transmission to obtain a received signal, wherein the transmission and the scanning occur concurrently at the first device;
   means for cancelling, at least partially from the received signal, an interference caused by the transmission from the first device on the received signal;
   means for determining whether a signal resulting from the cancelling the interference caused by the transmission from the first device on the received signal indicates usage by a primary user of the shared spectrum,
   wherein the means for scheduling is configured to:
      determine that carrier aggregation is to be used for a transmission;
      determine that a potential carrier for the carrier aggregation is subject to usage by the primary user;
      determine a self-interference cancellation complexity for a potential combination of carriers including the potential carrier; and
      select one or more carriers for the carrier aggregation based at least in part on the self-interference cancellation complexity.

14. The apparatus of claim 13, wherein the transmission is a single-input single-output (SISO) transmission, wherein the means for scheduling is configured to schedule the SISO transmission between multiple-input multiple-output (MIMO) transmissions.

15. The apparatus of claim 14, further comprising:
   means for determining that a serving load allows scheduling a transmission gap between the MIMO transmissions, wherein the transmission gap has no scheduled transmission; and
   means for bypassing the means for cancelling during the transmission gap.

16. A non-transitory computer readable medium storing computer executable code, comprising instructions for:
   scheduling a transmission, from a first device, in a shared spectrum;
   scanning, at the first device, at least a portion of the shared spectrum during the transmission to obtain a received signal, wherein the transmission and the scanning occur concurrently at the first device;
   cancelling, at least partially from the received signal, an interference caused by the transmission from the first device on the received signal;
   determining whether a signal resulting from the cancelling the interference caused by the transmission from the first device on the received signal indicates usage by a primary user of the shared spectrum,
   wherein the instructions for scheduling the transmission include instructions for:
      determining that carrier aggregation is to be used for the transmission;
      determining that a potential carrier for the carrier aggregation is subject to usage by the primary user;
      determining a self-interference cancellation complexity for a potential combination of carriers including the potential carrier; and
      selecting one or more carriers for the carrier aggregation based at least in part on the self-interference cancellation complexity.

17. The non-transitory computer readable medium of claim 16, wherein the transmission is a single-input single-output (SISO) transmission and wherein the instructions for scheduling the transmission comprise instructions for scheduling the SISO transmission between multiple-input multiple-output (MIMO) transmissions.

18. The non-transitory computer readable medium of claim 16, wherein the instructions for cancelling include instructions for processing the received signal using a self-interference cancellation circuitry, further comprising instructions for:
   determining that a serving load allows scheduling a transmission gap between the MIMO transmissions, wherein the transmission gap has no scheduled transmission; and
   bypassing the processing of the received signal by the self-interference cancellation circuitry during the transmission gap.

19. An apparatus comprising:
   a scheduler configured to schedule a transmission, from the apparatus, in a shared spectrum;
   a receiver configured to scan, at the apparatus, at least a portion of the shared spectrum during the transmission to obtain a received signal, wherein the transmission and the scanning occur concurrently at the apparatus;
   a self-interference cancellation circuit configured to cancel, at least partially from the received signal, an interference caused by the transmission from the apparatus on the received signal; and
   a processor configured to determine whether a signal resulting from the cancelling the interference caused by the transmission from the apparatus on the received signal indicates usage by a primary user of the shared spectrum,
   wherein the scheduler is further configured to:
      determine that carrier aggregation is to be used for a transmission;
      determine that a potential carrier for the carrier aggregation is subject to usage by the primary user;
      determine a self-interference cancellation complexity for a potential combination of carriers including the potential carrier; and
      select one or more carriers for the carrier aggregation based at least in part on the self-interference cancellation complexity.

20. The apparatus of claim 19, wherein the scheduling component is configured to schedule the transmission as a single-input single-output (SISO) transmission between multiple-input multiple-output (MIMO) transmissions.

21. The apparatus of claim 20, wherein the scheduling component is further configured to determine that a serving load allows scheduling a transmission gap between the MIMO transmissions, wherein the transmission gap has no scheduled transmission; and bypass the self-interference cancellation circuit during the transmission gap.

22. The apparatus of claim 20, wherein the scheduling component is configured to schedule the transmission based on a utility function of one or more of a serving load of a transmitting device, throughput of the SISO transmission, and power consumption of the self-interference cancellation circuit.

23. The apparatus of claim 20, wherein the self-interference cancellation circuit is further configured to process the received signal using self-interference cancellation circuitry parameters for an antenna selected for the transmission based on spatial characteristics of a recipient of the SISO transmission.

24. The apparatus of claim 19, further comprising a transmitter communicatively coupled to the self-interference cancellation circuit.

25. The apparatus of claim 19, wherein the processor is further configured to assign a weight to the potential combination of carriers based on the self-interference cancellation complexity, wherein the selection of the one or more carriers for the carrier aggregation is further based on weights based on channel interference and link quality of users.

26. The apparatus of claim 19, wherein the processor is further configured to determine that the potential carrier for the carrier aggregation is subject to usage by the primary user by determining that the potential carrier is in a channel subject to radar detection.

* * * * *